United States Patent
Jung et al.

(10) Patent No.: US 9,891,667 B2
(45) Date of Patent: Feb. 13, 2018

(54) CONNECTABLE MODULE AND ELECTRONIC DEVICE INCLUDING THE SAME

(71) Applicant: Samsung Electronics Co., Ltd., Suwon-si, Gyeonggi-do (KR)

(72) Inventors: Ik Su Jung, Suwon-si (KR); Jong Hae Kim, Seoul (KR); Byoung Uk Yoon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/989,405

(22) Filed: Jan. 6, 2016

(65) Prior Publication Data

US 2016/0255733 A1   Sep. 1, 2016

(30) Foreign Application Priority Data

Feb. 27, 2015  (KR) ..................... 10-2015-0028128

(51) Int. Cl.
  *G06F 1/16*  (2006.01)
  *G04B 37/22*  (2006.01)
  *H01R 4/64*  (2006.01)
  *H01R 12/71*  (2011.01)

(52) U.S. Cl.
  CPC ......... *G06F 1/1633* (2013.01); *G04B 37/225* (2013.01); *G06F 1/163* (2013.01); *H01R 4/64* (2013.01); *H01R 12/714* (2013.01)

(58) Field of Classification Search
  None
  See application file for complete search history.

(56) References Cited

U.S. PATENT DOCUMENTS

| | | | | |
|---|---|---|---|---|
| 5,513,996 A * | 5/1996 | Annerino | ............. | H01R 4/4809 439/95 |
| 6,459,890 B1 * | 10/2002 | Kim | ....................... | G04G 17/00 368/204 |
| 2004/0102062 A1 * | 5/2004 | Liao | .................... | H01R 13/2435 439/66 |
| 2004/0235316 A1 * | 11/2004 | Liao | ................... | H01R 13/2435 439/66 |
| 2012/0080462 A1 * | 4/2012 | Hajarian | ................... | A45F 5/00 224/219 |

FOREIGN PATENT DOCUMENTS

KR      10-0890252 B1    3/2009

* cited by examiner

*Primary Examiner* — Courtney Smith
*Assistant Examiner* — Rashen E Morrison
(74) *Attorney, Agent, or Firm* — Jefferson IP Law, LLP

(57) ABSTRACT

A connectable module used in a wearable electronic device is provided. The connectable module includes a first elastic part disposed to exert a specific elastic force against a pressure applied in a side direction, a second elastic part disposed to exert a specific elastic force against a pressure applied in a vertical direction, and a main body connected to the first elastic part and the second elastic part.

16 Claims, 16 Drawing Sheets

CONNECTABLE MODULE AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Feb. 27, 2015 in the Korean Intellectual Property Office and assigned Serial number 10-2015-0028128, the entire disclosure of which is hereby incorporated by reference.

TECHNICAL FIELD

The present disclosure relates to a structure for providing an electrical contact point of an electronic device.

BACKGROUND

Electronic devices have a communication function and are widely used in a form with a portable size. Recently, forms of electronic devices are developed into forms (for example, wearable forms) put on or worn on a wrist. Appearances of such electronic devices have been modified in various forms. Accordingly, arrangements and shapes of device components mounted on a typical electronic device are required in various forms.

As arrangements or shapes of a typical wearable electronic device are newly constructed, an electrical connection relationship between components mounted on a device may not be robust.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a connectable module for more robustly supporting an electrical connection relationship between mounted device components and an electronic device including the same.

Another aspect of the present disclosure is to provide a connectable module for providing an improved communication function through a stable electrical connection and the enlargement of a ground area and an electronic device including the same.

In accordance with an aspect of the present disclosure, a wearable electronic device is provided. The wearable electronic device includes a main printed circuit board (PCB), a bracket where the main PCB is disposed at an upper part or a lower part of the bracket, a body case of which at least a portion is disposed at one side of the bracket, and at least one connectable module disposed at the other side of the bracket to electrically connect a specific point of the main PCB and the body case, wherein the connectable module includes a first elastic part disposed to exert a specific elastic force in a side direction, a second elastic part disposed to exert a specific elastic force in a vertical direction, and a main body connected to the first elastic part and the second elastic part.

In accordance with another aspect of the present disclosure, a connectable module used in a wearable electronic device is provided. The connectable module includes a first elastic part disposed to exert a specific elastic force against a pressure applied in a side direction, a second elastic part disposed to exert a specific elastic force against a pressure applied in a vertical direction, and a main body connected to the first elastic part and the second elastic part.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
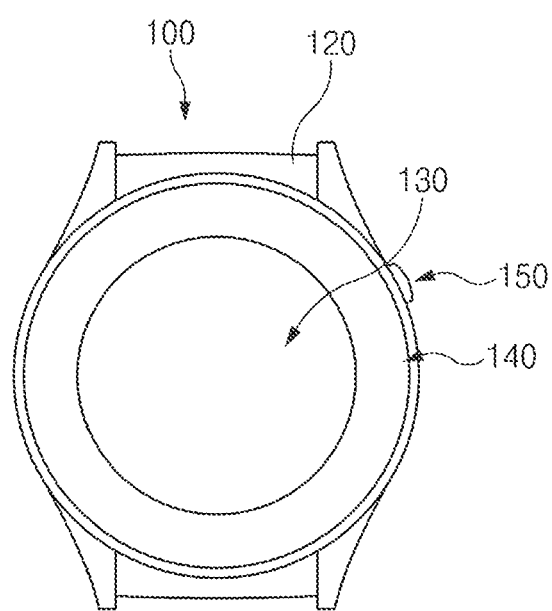
FIG. 1A is a front view of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a central processing unit (CPU) or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to some embodiments of the present disclosure, an electronic device may be home appliance. The home appliance may include at least one of, for example, televisions (TVs), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to various embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

According to various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

Figure 1B:
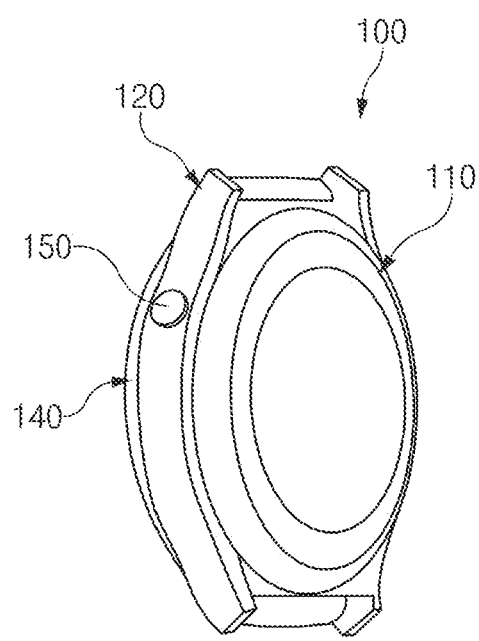
FIG. 1B is a perspective view illustrating an appearance of an electronic device according to an embodiment of the present disclosure.

FIG. 1A is a front view of an electronic device according to an embodiment of the present disclosure. FIG. 1B is a perspective view illustrating an appearance of an electronic device according to an embodiment of the present disclosure. In the description below, a watch in wearable form is described as an electronic device. However, an electronic device according to an embodiment of the present disclosure may include a device worn or gripped at various positions such as rings, bracelets, necklaces, and belts.

Referring to FIGS. 1A and 1B, a wearable electronic device 100 of the present disclosure may include a cover housing 110, a body case 120, a display 130, a bezel wheel 140, and a key assay 150. Additionally, the wearable electronic device 100 may further include a wearing module connected to the cover housing 110 and fixing the wearable electronic device 100 on a user's wrist. The wearing module, for example, may include two strip-shaped wearing parts respectively connected to both edges of the cover housing 110. The wearing parts may be prepared in a structure that they are coupled with each other and the length adjustment is available according to a coupled position.

In relation to the cover housing 110, for example, an empty area is prepared at the center to allow device components (for example, the display 130 and so on) of the wearable electronic device 100 to be disposed and sidewalls may be disposed in a form of surrounding the empty area. In relation to the cover housing 110, the empty area may be prepared in an elliptical form (or a circular form) to allow elliptical (or circular) device components to be disposed at the center. Additionally, coupling parts extending from the circular border toward the outside direction may be disposed at one side of the cover housing 110 to allow one sides of the wearing parts to be coupled. The coupling parts may be disposed to be symmetric vertically or horizontally based on the center of the empty area. The cover housing 110, for example, may be prepared with a non-conductive material. Alternatively, at least a portion of the cover housing 110 may be prepared with a metallic material and an area coupled to the body case 120 may be prepared with a non-metallic material. Alternatively, an area coupled to the body case 120 in the portion of the metallic material cover housing 110 may be coated with a non-metallic material. A specific size of hole may be prepared in the center floor of the cover housing 110.

The body case 120 may be coupled to the cover housing 110 to serve to protect device components (for example, the display 130, a battery, a printed circuit board (PCB), and so on) of the wearable electronic device 100 disposed inside. In relation to the body case 120, a specific size of through hole is disposed at the center to form an opening part. The size of the through hole may determine an exposed size of the display 130. The body case 120 may include a peripheral part for forming a through hole and a sidewall vertical or having a specific angle with respect to the peripheral part and disposed to surround the thorough hole. The sidewall of the body case 120 may be disposed to face the sidewall of the cover housing 110.

The body case 120 may include protruding parts surrounding a through hole periphery and extending by a specific height (for example, a plurality of protruding parts continuously disposed with gaps or protruding parts connected as one with a sidewall form). Accordingly, the strip-shaped protruding parts may be coupled with the bezel wheel 140. Herein, the strip-shaped protruding parts may be disposed directly or by using an additional fastener as a medium around a through hole. A coupling hole 121 to which the key assay 150 is coupled may be disposed at one side of the body case 120. As shown in the drawing, the position of the coupling hole 121 is relatively closely disposed in an area where a wearing module is coupled. The position of the coupling hole 121 may be prepared variously according to an arrangement position of the key assay 150. Additionally, the number of the coupling holes 121 may vary according to the number of the key assays 150.

At least a portion of the body case 120, for example, may be prepared with a metallic material. The metallic material body case 120 may perform an antenna function. For example, the body case 120 may be connected to a communication module mounted on a PCB seated inside to transmit a specified signal. According to various embodiments of the present disclosure, the body case 120 may be used as some antennas of a specific communication module. For example, the body case 120 may be used as at least some antennas of a 2nd generation (2G), 3rd generation (3G), or 4th generation (4G) mobile communication module. Alternatively, the body case 120 may be used as at least some antennas of a near field communication (NFC) communication module or a Bluetooth communication module. In relation to this, in relation to the body case 120, at least one point in the inner sidewall may contact a feeding part of the communication module.

At least a portion of the display 130 may be exposed to the outside through the through hole of the body case 120. The exposed display 130 may have a form corresponding to the form of the through hole, for example, a circular form. The display 130 may include an area exposed through the through hole and an area seated inside the body case 120. The display 130, for example, may include a panel area for displaying images or texts (for example, a display panel, a touch panel, and so on) and at least one window for protecting the panel area (for example, an external window or an internal window). Additionally, an NFC coil may be further inserted and disposed in the panel area of the display 130. In relation to the display 130, a touch screen and a display panel may be disposed. Additionally, an NFC antenna (or NFC coil) may be disposed inside the display 130. Accordingly, the display 130 may have a disc form of a specific thickness as whole, and a signal line (for example, flexible PCB (FPCB)) relating to signal supply of a display panel, a signal line relating to signal supply of a touch screen, a signal line for NFC signal transmission/reception, and a signal line for the ground may be protrudingly disposed in the outer periphery of the disk. The display 130, for example, may be equipped with various types such as a liquid crystal display (LCD) type and an organic light-emitting diode (OLED) type.

The signal line for the ground may be connected to at least some areas (for example, a driver integrated circuit (IC) relating to display panel operation) formed of a metallic material in the display 130. The signal line for the ground and at least a portion of the display 130 may electrically contact a main PCB (or printed circuit substrate) to serve as the ground of the main circuit substrate. Alternatively, the signal line for the ground and at least a portion of the display 130 may be connected to a ground terminal of a communication module disposed in a main PCB to serve as the ground of the communication module. One sides of the signal lines may be fixedly disposed at one side a bracket described below.

The bezel wheel 140 may be disposed around the through hole of the body case 120. The bezel wheel 140, for example, may be rotatably disposed while engaging with protruding parts formed around the through hole of the body case 120. The center of the bezel wheel 140 may be prepared in an empty strip form. The bezel wheel 140 may be disposed spaced by a specific height from the front surface of the body case 120. At least a portion of the bezel wheel 140 may be prepared with a non-conductive material. For example, the inside part of the bezel wheel 140 may be prepared with a non-conductive material such as a ceramic material or a poly-carbonate (PC) material. The outside part of the bezel wheel 140 may be prepared with a metallic material such as iron, aluminum, or a metal alloy. The inside part and the outside part of the bezel wheel 140 may be prepared integrally or in a firmly coupled form. Signals may be emitted through the body case 120 serving as an antenna, passing through the inside part of the bezel wheel 140 prepared with a non-conductive material.

The key assay 150, for example, may include a head part and a projection vertically extending from the center of the head part. A groove in at least one direction, for example, a line-shaped groove, may be prepared at the upper surface of the header part. The header part may be prepared in a disc form having the convex top surface. A pattern groove is disposed at the side part of the header part to increase the frictional force of a contacting object during the grasping of the header part or the rotation of the header part. The key assay 150 may be fixedly inserted into the coupling hole 121 disposed at the body case 120.

As mentioned above, the wearable electronic device 100 may be disposed to allow at least a portion of the metallic body case 120 to be used as an antenna of a mounted communication module. In relation to this, the wearable electronic device 100 may include a cover housing formed of a non-metallic material or a non-conductive material, which is coupled with the body case 120 while facing a user's skin to prevent the body case 120 from contacting the user's skin. Additionally, the wearable electronic device 100 may provide a connectable module in order to stably support an electrical contact between the body case 120 and a main PCB where a communication module loaded inside is mounted.

According to various embodiments of the present disclosure, the wearable electronic device 100 may include: a front interface having a circular form generally and providing a display and user input unit (for example, a key assay and a display of a touch function); a body case having a similar form to the display form, forming a mounting space of an internal component, and forming the appearance; a cover housing disposed at the rear surface of the wearable electronic device 100 to seal the inner mounting space and adhering to or contacting a user mainly; and a wearing part (or a wearing means) connected to the body case to be worn by a user. A bezel area including various input/output function parts may be disposed adjacent to the display periphery and may be prepared in a wheel structure rotating to implement various functions. A push button used as an input device or a rotating button in crown structure (for example, a key assay) may be disposed around the body case 120. Additionally, a buckle part for simple coupling may be further provided at one end of the wearing part and a form of a hole, a protection, or a groove for engaging with the buckle may be further provided at the other end engaging with the buckle part. As the wearing part is coupled in a spring bar form, replacement is possible like a general watch.

Figure 2:
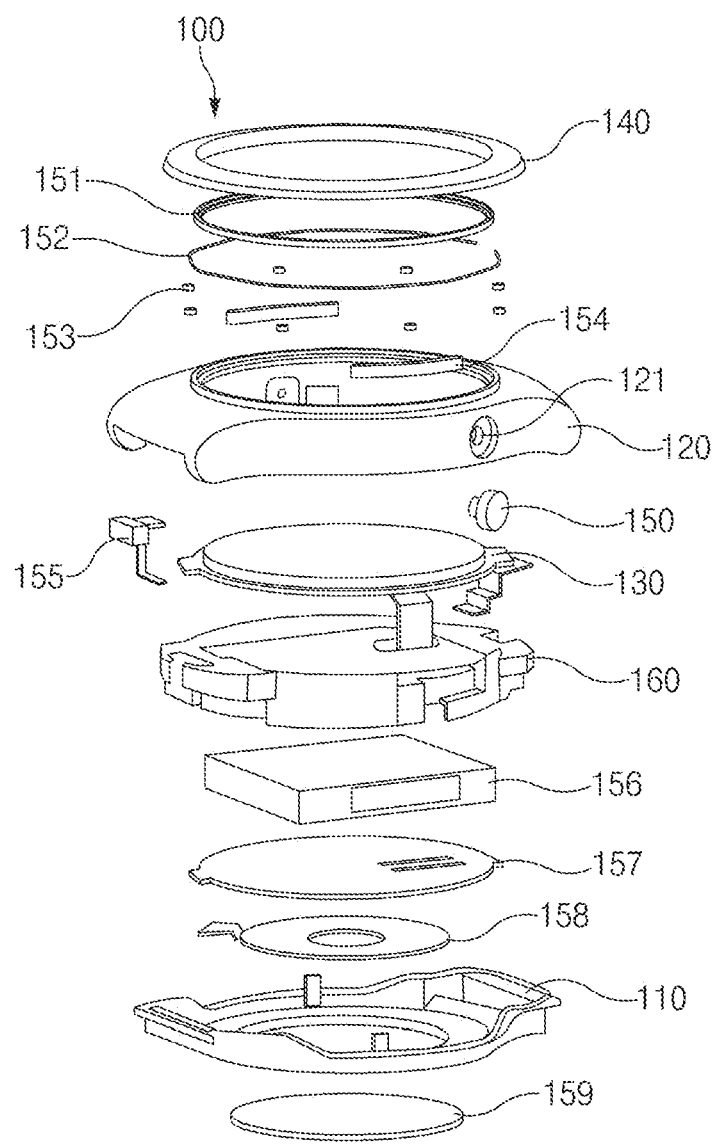
FIG. 2 is an exploded perspective view of a wearable electronic device according to an embodiment of the present disclosure.

FIG. 2 is an exploded perspective view of a wearable electronic device according to an embodiment of the present disclosure.

Referring to FIG. 2, a wearable electronic device 100 may include a bezel wheel 140, a friction adjustment ring 151, a fixed wire 152, wheel magnets 153, a front part magnet 154, a body case 120, a key assay 150, a display 130, an rotation detection sensor 155, a bracket 160, a battery 156, a main PCB 157, a wireless charging unit 158, a cover housing 110, and a rear deco 159. The wearable electronic device 100 has a circular form generally and also, main components such as the body case 120 and an opening part, the cover housing 110, the bracket 160, the display 130, and the main PCB 157 may be formed generally following a circular form.

The bezel wheel 140 may be mounted rotatably around the center opening part (or through hole) of the body case 120. The bezel wheel 140 may further include a magnet or gear structure in order to provide an operating feeling. Various materials such as ceramic may be applied to the bezel wheel 140 in order for rigidities and design expression. Additionally, an inscription may be disposed at one side of the bezel wheel 140 in order to display various functions. Additionally, the rotation detection sensor 155 may be disposed at one side of the bezel wheel 140 in order to process a wheel's rotation as an input.

The friction adjustment ring 151 may be disposed inside the bezel wheel 140 in order to serve to support the bezel wheel 140. Additionally, although the friction adjustment ring 151 contacts the bezel wheel 140, it may serve to reduce a friction occurring while the bezel wheel 140 rotates. The friction adjustment ring 151 may be prepared with a material of a relatively low friction coefficient or may have a surface processing state that lowers a friction coefficient.

The wheel magnets 153 may be disposed at one side of the body case 120. In relation to this, a fixing groove to which at least one of the wheel magnets 153 is fixedly inserted is disposed at one side of the body case 120. When the wheel magnets 153 is fixedly inserted into the fixing groove, it may be disposed with a specific gap with respect to the bezel wheel 140 having at least a portion prepared with a metallic material. According to applying attraction to the bezel wheel 140 as the wheel magnets 153 face the bezel wheel 140, the wheel magnets 153 may form a force to allow a user to feel an operating feeling (for example, severed feeling) while rotating the bezel wheel 140 along the surface of the body case 120. The wheel magnets 153, as shown in the drawing, may be spaced a specific interval from each other around the through hole of the body case 120.

The fixing wire 152 may serve to fix the friction adjustment ring 151 not to rotate along the bezel wheel 140. In relation to this, the fixing wire 152 may be disposed between the friction adjustment ring 151 and the peripheral part of the through hole of the body case 120.

The front part magnet 154 may be disposed between the body case 120 and the fixing wire 152. The front part magnet 154, for example, may have a specific length and may be fixedly disposed at one side of the body case 120. In relation to this, a groove into which the front part magnet 154 is fixedly inserted may be disposed at one side of the body case 120. The front part magnet 154 may improve the operating feeling of the bezel wheel 140 by applying attraction to the bezel wheel 140, while serving to fix the fixing wire 152.

The body case 120, as described above, may have the through hole (or an opening part) at the center and may have a circular form to surround the through hole. Additionally, the body case 120 may include an upper end part and a lower end part, which have a specific width at one outer peripheral part of a circular form and are formed to be symmetric to each other based on a direction traversing the center of the through hole. The body case 120 may be formed of a metallic material to serve as an antenna. Accordingly, the size, form, and curving part of the body case 120 may be modified in various forms according to communication characteristics of a communication module. A window housing may be disposed inside the through hole of the body case 120. The window housing may include an outer skin part (for example, an upper end glass or an outer glass) and an inner skin part (for example, a low end glass or an inner glass) in order to provide a circular display 130. The outer skin part and the inner skin part may be prepared with a transparent material (for example, glass, plastic, and so on) in order to expose the display 130. As mentioned above, the display 130 may include a panel area for supporting screen display and touch and a window for protecting the panel area.

The key assay 150 may be fixedly inserted into the coupling hole 121 formed at the side of the body case 120. The key assay 150 may be prepared to be rotatable. When the key assay 150 rotates, the wearable electronic device 100 may detect it and process it as an input signal. Although it is shown in the drawing that one key assay 150 and one coupling hole 121 are disposed, various embodiments of the present disclosure are not limited thereto. For example, the key assay 150 and the coupling hole 121 may be prepared in plurality and a different signal occurrence may be allocated to each key assay 150.

The display 130 may be prepared in a protruding round disc form as shown in the drawing. The window housing may be disposed at the upper part of the display 130 to protect the display 130. Signal lines (for example, a touch screen signal line and a display panel signal line) relating to the drive of the display 130 may be prepared at one side of the display 130. The signal lines may be electrically connected to the main PCB 157 through a side part of the bracket 160.

The rotation detection sensor 155 may be fixed at one side of the bracket 160 and may detect a rotary movement of the bezel wheel 140 seated at the body case 120. A sensor signal collected by the rotation detection sensor 155 may be delivered to the main PCB 157 and used as an input signal according to a movement of the bezel wheel 140.

The bracket 160 may include a seating part at one side where the battery 156 is seated and the upper surface where the battery 156 is seated may include areas where the main PCB 157 is disposed. In relation to this, the bracket 160 may be prepared in a stepped form, and the battery 156 and the main PCB 157 may be sequentially stacked inside the stepped form. The rear part of the display 130 may be disposed at the other side of the bracket 160. According to an embodiment of the present disclosure, line arrangement grooves, where at least one signal line on the display 130 is disposed, may be prepared at the side of the bracket 160. Signal lines on the display 130 may be electrically connected to the main PCB 157 through the line arrangement grooves of the bracket 160.

According to an embodiment of the present disclosure, at least one connectable module may be disposed at the side of the bracket 160. In relation to this, at least one module arrangement groove may be formed at the side of the bracket 160 and at least one connectable module at a module arrangement groove may connect the bezel wheel 140 and the main PCB 157 electrically. The bracket 160, for example, may further include other assembly structures such as an antenna contact, a motor, a sensor, an FPCB, and so on.

All or part of an area may be implemented in a circular form generally in order to improve space efficiency. In relation to this, the battery 156 may include a battery protection circuit module (PCM) (for example, a protection circuit unit) whose at least a portion is implemented in a circular form or which is generally implemented in a circular form, or may be implemented in an arc form by diversifying a jelly roll structure therein or the form and folding method of a package. Additionally, the battery 156 may maximize a battery capacity as seated on the bracket 160 by implementing a stepped structure through a method of arranging the PCM (for example, a protection circuit unit) in parallel identical to a battery cell arrangement direction or configuring a stacking specific size of an inside jelly roll to be small.

The main PCB 157 may be a substrate where various modules for performing signal processing of the wearable electronic device 100 are mounted. For example, the main PCB 157 may include a processor relating to an operation of the display 130, a processor relating to a communication module operation, and a processor for input signal processing of an input device (for example, the bezel wheel 140, the key assay 150, and the display 130). Additionally, a communication module (for example, a 3G or 4G mobile communication module, a Bluetooth communication module, a WiFi direct communication module, and so on) may be mounted on the main PCB 157. At least a portion of an antenna supporting the communication module, as described above, may include the body case 120. Accordingly, the main PCB 157 may include contact point terminals that are electrically connectable to a connectable module electrically connected to the body case 120.

The wireless charging unit 158, for example, may receive energy in a wireless form, which is delivered from the outside, and deliver the energy to the battery 156 through the main PCB 157 or directly. The wireless charging unit 158 may be disposed between the main PCB 157 and the cover housing 110. The wireless charging unit 158, for example, as shown in the drawing, may be prepared in an empty strip form at the center and deliver, to the battery 156, a current induced or resonated from a wireless energy supplied from the outside.

The cover housing 110 may be coupled with the body case 120. The wireless charging unit 158, the main PCB 157, and the battery 156 may be mounted inside the cover housing 110 and a lower one side of the bracket where the display 130 is disposed may be seated on one side. The cover housing 110 may further include a heterogeneous material structure part of glass, ceramic, and so on in order to obtain design differentiation and various sensor interface areas. A mounting structure such as a metal plate or a hook (not shown) for mounting a cradle during charging may be further included inside the cover housing 110. Additionally, a magnetic material relating to charging cradle mounting may be further included on at least one side at the inside/outside part of the cover housing 110. The cover housing 110 may be coupled with the body case 120 through a screw, snap-fit, bonding, a tape, welding, and so on and a sealing member or structure for waterproof may be further provided at the position where each component in each cover housing 110 is disposed.

The rear deco 159 may be prepared to cover the opening part of the cover housing 110. Accordingly, the rear deco 159 may be disposed at the rear part (or a groove prepared inside the cover housing 110) of the cover housing 110. In order to cover the opening part of the cover housing 110, the rear deco 159, for example, may be formed larger than the size of the opening part of the cover housing 110. In the shown drawing, the rear deco 159 is shown in a disc but the present disclosure is not limited thereto. For example, the rear deco 159 may be prepared in various forms such as a polygonal form. The rear deco 159 may be prepared with a material such as ceramic in order to provide a good texture when contacting a user's skin.

As mentioned above, the wearable electronic device 100 may electrically connect the main PCB 157, where a communication module using the body case 120 as at least a portion of an antenna is mounted, and the body case 120.

Figure 3:
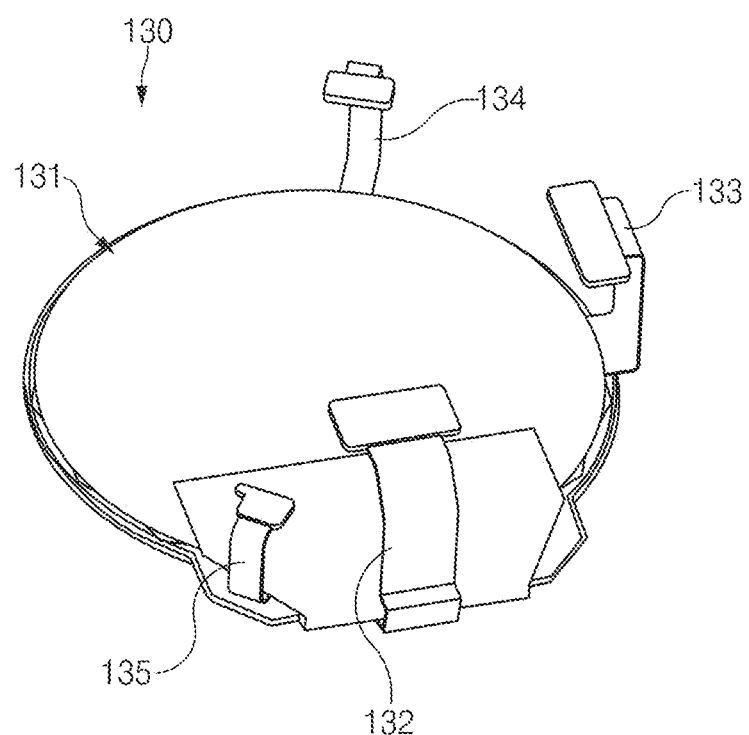
FIG. 3 is a view illustrating a display according to an embodiment of the present disclosure.

FIG. 3 is a view illustrating a display according to an embodiment of the present disclosure.

Referring to FIG. 3, the display 130 may include a stacking panel 131 where a touch screen, a display panel, and an NFC coil are stacked. The display 130, as shown in the drawing, may have a state that disc-shaped device components are stacked. According to an embodiment of the present disclosure, the display 130 may include a touch signal line 132 (for example, an FPCB type signal line) connected to a touch screen, a panel signal line 133 (for example, an FPCB type signal line) connected to a display panel, and an NFC signal line 134 (for example, an FPCB type signal line) connected to an NFC coil. The touch signal line 132 may be connected to the main PCB 157 and may deliver a touch signal occurring from a touch screen to the main PCB 157. The panel signal line 133 may receive an image signal relating to a screen configuration from the main PCB 157 and deliver the received image signal to the display panel. The NFC signal line 134 may deliver, to the main PCB 157, another electronic device transmission signal received by using the NFC coil.

According to various embodiments of the present disclosure, the display 130 may include a ground signal line 135 (for example, an FPCB type signal line). The ground signal line 135 may be connected to a metallic component (for example, a driver chip) included in the display 130. The ground signal line 135 may be connected to the ground terminal of the main PCB 157 or may be connected to the ground terminal of a communication module mounted on the main PCB 157. Alternatively, the ground signal line 135 may be electrically connected to a connectable module disposed at the bracket 160.

The NFC signal line 134 may include a pillar part connected to an NFC coil and a pad part having a larger width than a thickness of the pillar part at the end of the pillar part. Each of the panel signal line 133, the touch signal line 132, and the ground signal line 135 may also include a pillar part connected to a display panel, a pillar part connected to a touch screen, and a pillar part connected to a metallic component and a pad part at the end of each pillar part.

Figure 4:
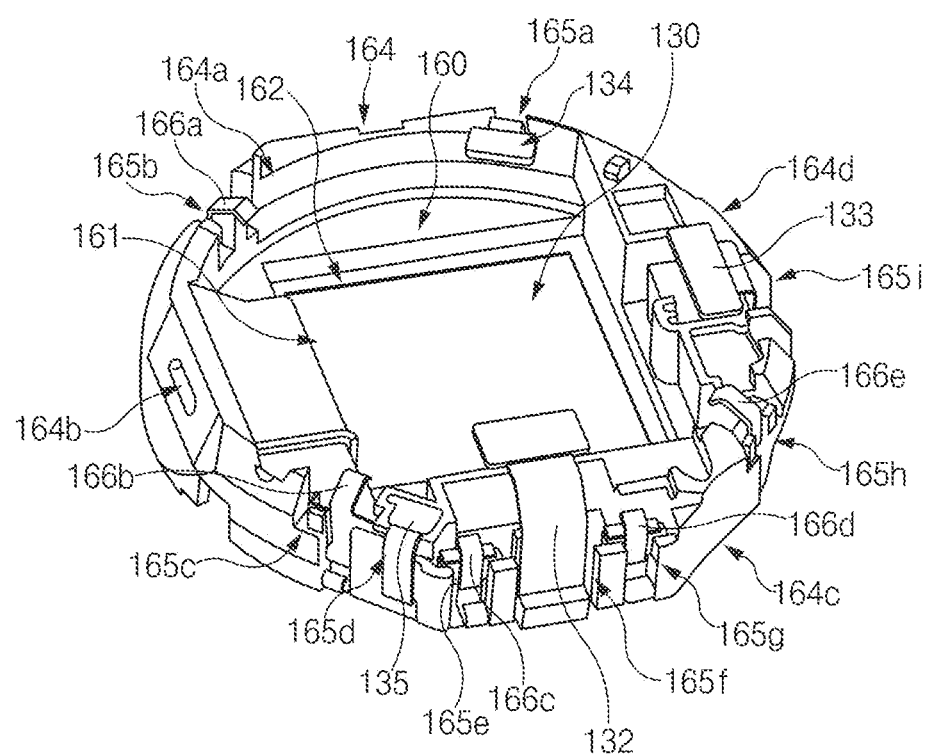
FIG. 4 is a view illustrating a bracket coupled with a display according to an embodiment of the present disclosure.

FIG. 4 is a view illustrating a bracket coupled with a display according to an embodiment of the present disclosure.

Referring to FIG. 4, in relation to a wearable electronic device according to an embodiment of the present disclosure, the bottom part of the display 130 may be disposed at one surface (for example, an upper surface) of the bracket 160. A bottom part where the stacking panel 131 of the display 130 is disposed may be disposed at the upper part of the bracket 160. At least a portion of the bottom part of the display 130 may be exposed through the opening part 161 formed at the center of the bracket 160. The signal lines 132, 133, 134, and 135 of the display 130 may be disposed at the specific positions of the side and the upper part of the bracket 160.

The bracket 160, for example, may include the opening part 161 prepared at the center, a strip-shaped center part 162 prepared to surround the periphery of the opening part 161, and sidewalls 164 extending higher than the center part 162 in an edge area of the center part 162 to allow the battery 156 to be seated in the center part 162. The borders of the sidewalls 164 may be connected in a circular form. The bracket 160 may include a semi-disc shaped first sidewall 164a disposed at an upper side based on the center part 162 disposed at the center, a semi-disc shaped second sidewall 164b disposed at the left side, a semi-disc shaped third sidewall 164c disposed at the lower side, and a semi-disc shaped fourth sidewall 164c disposed at the right side. The first sidewall 164a may be prepared in a stepped form. For example, a semi-circular stepped part may be prepared at the upper end part of the first sidewall 164a. A circular side part prepared at the battery 156 may be seated at the semi-circular stepped part prepared at the first sidewall 164a.

According to an embodiment of the present disclosure, the outer periphery of the first sidewall 164a may include an eleventh sidewall groove 165a where a portion of the NFC signal line 134 is fixedly inserted and a twelfth sidewall groove 165b where the first connectable module 166a electronically connected to the inner sidewall of the body case 120 where the bracket 160 is seated is fixedly inserted. The eleventh sidewall groove 165a may be prepared in a form that a specific position of the first sidewall 164a is recessed by a specific width toward the inside. A pad part of the NFC signal line 134 may be disposed at the upper end of the eleventh sidewall groove 165a. The pad part of the NFC signal line 134 may be electrically connected to one side of the facing main PCB 157. The twelfth sidewall groove 165b may be prepared in a form that a specific position (for example, a boundary area with the second sidewall 164b) of the first sidewall 164a is recessed by a specific width toward the inside. The first connectable module 166a may be fixedly seated at the twelfth sidewall groove 165b. A first elastic part formed at the upper end of the first connectable module 166a may be exposed to the upper end of the twelfth sidewall groove 165b to provide elastic force by a force applied directly below. For example, while the main PCB 157 is disposed to cover the bottom surface of the bracket 160, a specific point of the main PCB 157 may electrically contact the first elastic part of the first connectable module 166a.

The first connectable module 166a may be formed of a conductive material for electrically connecting to the main PCB 157 and the body case 120 and may be prepared with a material having an elastic force of more than a specific size to provide a stable coupling force during assembly. According to an embodiment of the present disclosure, the first connectable module 166a may be prepared with a metallic material such as iron, copper, aluminum or an alloy thereof. According to various embodiments of the present disclosure, the first connectable module 166a may be prepared with the same material as the body case 120 substantially. At least a portion of the first connectable module 166a, for example, may have a clip form.

According to an embodiment of the present disclosure, various structures coupled with the body case 120 may be disposed at the second sidewall 164b. According to an embodiment of the present disclosure, an antenna pattern may be disposed on at least a portion of the second sidewall 164b.

According to an embodiment of the present disclosure, a thirty first sidewall groove 165c where a second connectable module 166b is fixedly inserted, a thirty second sidewall groove 165d where a ground signal line 135 is fixedly inserted, a thirty third sidewall groove 165e where the third connectable module 165e where a third connectable module 166c is fixedly inserted, a thirty fourth sidewall groove 165f where a touch signal line 132 is fixedly inserted, and a thirty fifth sidewall groove 165g where a fourth connectable module 166d is fixedly inserted may be disposed at the third sidewall 164c. Protections and grooves corresponding to the form of the second connectable module 166b may be disposed at the thirty first sidewall groove 165c.

The second connectable module 166b may be prepared with the same form, size, and material as the first connectable module 166a substantially. When the second connectable module 166b is prepared in a radiation form (for example, a cross form) that a plurality of leads are disposed based on the center of a specific width, the thirty first sidewall groove 165c may include a groove (or a hole) where at least one lead is fixed and an opening part where at least one lead is exposed.

The third connectable module 166c may be prepared with the same form, size, and material as the second connectable module 166b substantially. The fourth connectable module 166d may be prepared with the same form, size, and material as the third connectable module 166c substantially. According to an embodiment of the present disclosure, the third connectable module 166c may have the same form as the second connectable module 166b but may be prepared with a relatively small size. Such a size and form may be adjusted according to changes in a design method.

According to various embodiments of the present disclosure, the first connectable module 166a and the second connectable module 166b may serve as a path for transmitting signals generated by the main PCB 157 or receiving signals from the outside. According to an embodiment of the present disclosure, at least one of the third connectable module 166c and the fourth connectable module 166d may serve as a ground terminal of the main PCB 157. The third connectable module 166c, for example, may be electrically connected to the ground signal line 135. Accordingly, the third connectable module 166c may form a ground path for connecting the display 130, the ground signal line 135, and the main PCB 157. Alternatively, the fourth connectable module 166d, for example, may be electrically connected to the ground signal line 135. At least one connection point connecting to the third connectable module 166c or the fourth connectable module 166d may be prepared at the main PCB 157. A connection point area in the main PCB 157, which connects to the third connectable module 166c or the fourth connectable module 166d, may be prepared protruding more than an area contacting the first connectable module 166a and the second connectable module 166b.

Although it is shown in the drawing that the third connectable module 166c or the fourth connectable module 166d are disposed at both sides based on the touch signal line 132, various embodiments of the present disclosure are not limited thereto. For example, a sidewall groove where one of the third connectable module 166c and the fourth connectable module 166d is disposed may be disposed at the bracket 160. For example, a thirty third sidewall groove 165e or a thirty fifth sidewall groove 165g may be formed at the bracket 160. According to various embodiments of the present disclosure, as the third connectable module 166c and the fourth connectable module 166d, as a ground terminal, are simultaneously connected to the main PCB 157, they serve to divide the body case 120 where an additional segment area is not prepared. In relation to this, one side of the third connectable module 166c may be connected to one side of the main PCB 157 and the other side of the third connectable module 166c may be connected to one side of the body case 120. Then, one side of the fourth connectable module 166d may be connected to the other side of the main PCB 157 and the other side of the third connectable module 166c may be connected to the other side of the body case 120.

According to various embodiments of the present disclosure, an antenna pattern may be exposed in the groove inner wall of the thirty first sidewall groove 165c where the second connectable module 166b is disposed. As mentioned above, an antenna pattern may be additionally prepared on at least a portion of the border of the bracket 160. At least a portion of the antenna pattern may be prepared at the inner wall of the thirty first sidewall groove 165c. Accordingly, while being seated at the thirty first sidewall groove 165c, the second connectable module 166b may be electrically connected to an antenna pattern disposed at the inner wall of the thirty first sidewall groove. As a result, the second connectable module 166b may form a communication path connected to the body case 120, the antenna pattern, and the main PCB 157 (for example, a communication module mounted at a main PCB).

The thirty fourth sidewall groove 165f, for example, may be a groove where a portion (for example, a pillar part of the touch signal line 132) of the touch signal line 132 is disposed. A pad part of the touch signal line 132 may be disposed at the upper part of the thirty fourth sidewall groove 165f. The touch signal line 132 may be electrically connected to one of the front surface and the rear surface of the main PCB 157. According to various embodiments of the present disclosure, the pad part of the touch signal line 132 may be electrically connected to a surface different from one surface of the main PCB 157 that is electrically connected to the pad part of the panel signal line 133. For example, when the pad part of the panel signal line 133 is disposed at a front one side (for example, a front edge one side) of the main PCB 157, the pad part of the touch signal line 132 may be electrically connected to a rear one side (for example, a read edge one side) of the main PCB 157.

According to an embodiment of the present disclosure, a forty first sidewall groove 165*h* where the fifth connectable module 166*e* is fixedly inserted and a forty second sidewall groove 165*i* where the panel signal line 133 is fixedly inserted may be disposed at the fourth sidewall 164*d*. The fifth connectable module 166*e* may be prepared with the same form, size, and material as the first connectable module 166*a* and the second connectable module 166*b* substantially. One side of the fifth connectable module 166*e* may be electrically connected to the communication module of the main circuit substrate 157. The other side of the fifth connectable module 166*e* may be electrically connected to the body case 120. According to various embodiments of the present disclosure, an additional antenna pattern may be prepared at the peripheral part of the bracket 160 where the fifth connectable module 166*e* is disposed. The antenna pattern may be disposed around the forty first sidewall groove 165*h* and may be in contact electrically while the fifth connectable module 166*e* is inserted into the forty first sidewall groove 165*h*. The forty second sidewall groove 165*i* may be prepared in a groove form that one side of the panel signal line 133, for example, the pillar part of the panel signal line 133, is seated. In relation to the panel signal line 133, a pad part may be seated at the upper end part of the forty second sidewall groove 165*i*. The pad part of the panel signal line 133 may be electrically connected to a specific device component (for example, a processor or an image processor) of the main PCB 157 facing the lower part of the bracket 160.

As mentioned above, a plurality of connectable modules 166*a*, 166*b*, 166*c*, 166*d*, and 166*e* may be disposed at the bracket 160. At least one of the connectable modules 166*a*, 166*b*, 166*c*, 166*d*, and 166*e*, for example, may serve as a feeding part of a communication module mounted at the main PCB 157 and at least one of the remaining may serve as a ground part of a communication module. In the description, a connectable module serving as a feeding part and a connectable module serving as a ground part may be formed with a similar form, size, and material, or with a similar form and material but with a different size.

According to various embodiments of the present disclosure, the wearable electronic device 100 may have a structure for connecting the ground area of the display 130 and the ground of the main PCB in order to obtain antenna performance. Based on this, when an antenna (for example, the body case 120 or an additional antenna pattern) connected to the main PCB 157 transmits or receives signals, the wearable electronic device 100 may minimize the interference by the adjacent display 130. The ground structure of the display 130, for example, may be formed by withdrawing a ground pattern in a tail form from an FPCB where components of a display panel (for example, LCD or OLED) of the display 130 are mounted. Such a ground structure may improve antenna performance by seating the tail at the bracket 160 and grounding it at one surface of the main PCB 157.

Figure 5:
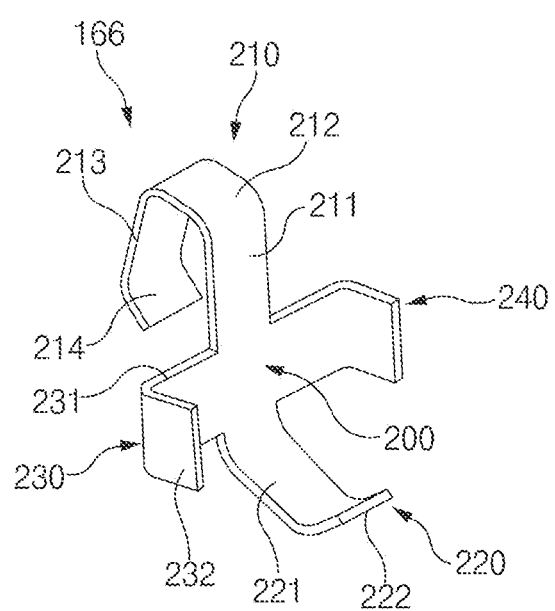
FIG. 5 is a view illustrating the form of a connectable module according to an embodiment of the present disclosure.

FIG. 5 is a view illustrating the form of a connectable module according to an embodiment of the present disclosure. Prior to description, a connectable module described below may correspond to the form of at least one of the above-mentioned first to fifth connectable modules 166*a*, 166*b*, 166*c*, 166*d*, and 166*e*. Alternatively, the connectable module may be one embodiment in which the sizes or materials of the first to fifth connectable modules 166*a*, 166*b*, 166*c*, 166*d*, and 166*e* are modified.

Referring to FIG. 5, the connectable module 166 may include a plurality of leads 210, 220, 230, and 240 radially connected to the main body 200 of a panel form having a specific width. The main body 200, for example, may be prepared in a rectangular form (or a polygonal, circular, or elliptical form) but the form of the main body 200 may be changed in correspondence to the number or form of the plurality of connected leads 210, 220, 230, and 240.

The plurality of leads 210, 220, 230, and 240, for example, may include: a first elastic part 210 having a specific thickness and width in the upper direction of the main body 200 and disposed; a second elastic part 220 having a specific thickness and width in the lower direction of the main body 200 and disposed; a first wing part 230 having a specific thickness and width in the left direction of the main body 200 and disposed; and a second wing part 240 having a specific thickness and width in the right direction of the main body 200 and disposed.

The first elastic part 210, for example, may include: an eleventh extension part 211 extending by a specific width from the main body 200 in the upper direction; a twelfth extension part 212 bending from the end of the eleventh extension part 211 in the first direction (for example, the front direction); a thirteenth extension part 213 bending from the end of the twelfth extension part 212 in a second direction (for example, a direction tilted at a specific slope at the lower part); and a fourteenth extension part 214 bending from the end of the thirteenth extension part 213 in a third direction (for example, a direction tilted at a specific slope in the direction of the main body 200. Accordingly, in relation to the first elastic part 210, a predetermine panel may generally have a bending form such as a hook form. According to various embodiments of the present disclosure, the fourteenth extension part 214 may have a relatively short length in comparison to the eleventh extension part 211 or the twelfth extension part 212. The eleventh extension part 211 may serve to support the twelfth extension part 212. The thirteenth extension part 213 may be disposed bent by a specific angle from the end of the twelfth extension part 212 and may exert an elastic force with respect to a pressure applied from the outside in the direction of the main body 200 based on the support of the twelfth extension part 212. As the thirteenth extension part 213 and the fourteenth extension part 214 are connected through bending, the first elastic part 210 may be in contact without scratches of contacting device components (for example, the body case 120 or the main PCB 157).

The second elastic part 220, for example, may include a twenty first extension part 221 disposed tilted at a specific angle (for example, an obtuse angle range based on the surface of the main body 200) with respect to the main body 200 at the edge of the main body 200 and twenty second extension part contact parts 700 extending from the end of the twenty first extension part in a specific direction (for example, a direction tilted at a specific angle in an upper side direction). A connection point of the twenty first extension part 221 and the twenty second extension part 222 may electrically or physically contact another device component (for example, the main PCB 157 or the body case 120). During this operation, the twenty first extension part 221 may exert elastic force in a vertical direction by using the connection point connected to the main body 200 as an axis. The second elastic part 220 may be disposed vertically symmetric to the first elastic part 210 based on the main body 200. According to various embodiments of the present disclosure, the second elastic part 220 may be disposed with a specific slope (for example, vertical) with respect to the first elastic part 210 based on the main body 200. For example, as formed in horizontal direction (a specific horizontally tilted direction) of the main body 200, the first elastic part 210 may electrically contact the body case 120 coupled to the side part. In this case, the second elastic part 220 disposed in an upper direction of the main body 200 may be disposed vertical (or in a form having a specific angle) to the first elastic part 210. In the above description, although it is shown that the form of the first elastic part 210 and the form of the second elastic part 220 are somewhat different, the form of the second elastic part 220 may be prepared in a form similar to the first elastic part 210 and vice versa.

The first wing part 230, for example, may include a first support part 231 having a specific width and length in the left direction of the main body 200 and a second support part 232 vertically extending from the end of the first support part 231 (for example, an opposite direction to the direction that the first elastic part 210 is disposed). The lengths and widths of the first support part 231 and the second support part 232 may be modified in correspondence to the form of the coupled bracket 160. The first wing part 230, as shown in the drawing, may be prepared in a ring form connected to the main body 200.

The second wing part 240 may be prepared with the same form as the first wing part 230. The second wing parts 240 may be symmetrically disposed at both sides by using the main body 200 as an axis. According to various embodiments of the present disclosure, although the first wing part 230 may be prepared with the same size and form as the second wing part 240, it may be modified in various forms in correspondence to the form of the fixedly inserted bracket 160. For example, the bending direction of the second wing part 240 may be opposite to the first wing part 230.

As mentioned above, in relation to the connectable module 166, the first elastic part 210 may be designed to exert elastic force in one direction (for example, a direction from the main body 200 to the front) and the second elastic part 220 may be designed to exert elastic force in another direction (for example, a direction parallel to the surface of the main body 200). According to various embodiments of the present disclosure, the twenty second extension part 222 of the second elastic part 220 may exert elastic force in a specific direction (for example, a direction from the main body 200 to the rear direction). Additionally, when the twelfth extension part 212 extends with a specific slope from the end of the eleventh extension part 211 to the upper side, the first elastic part 210 also may exert a specific elastic force in correspondence to a force applied in a direction from the upper to the lower.

Figure 6:
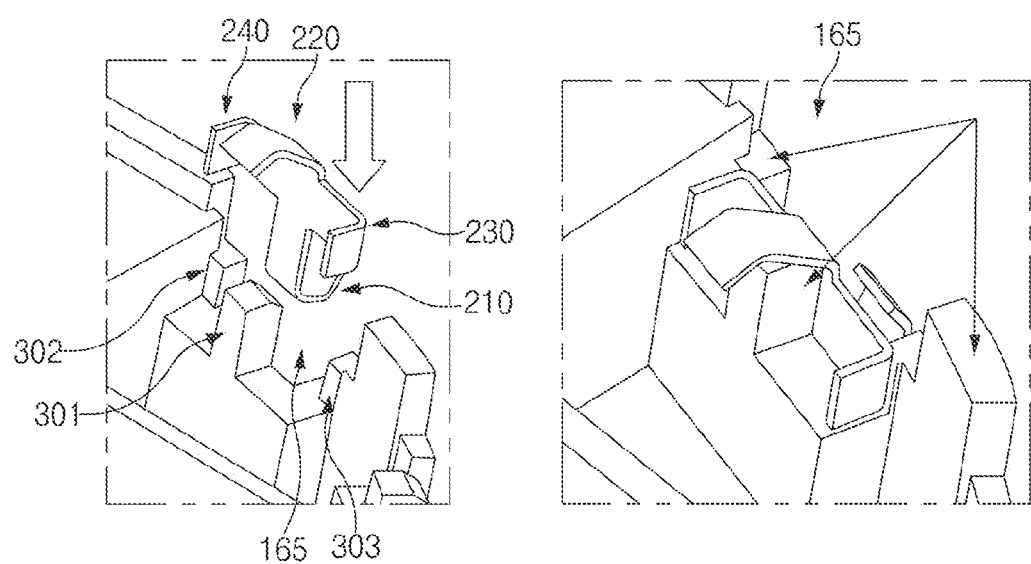
FIG. 6 is a view illustrating a connectable module and a bracket according to an embodiment of the present disclosure.

FIG. 6 is a view illustrating a connectable module and a bracket according to an embodiment of the present disclosure.

Referring to FIG. 6, the first elastic part 210 of the connectable module 166 is disposed in an outer direction of the bracket 160 and the second elastic part 220 may be inserted into the upper surface edge of the bracket 160 to be seated. In relation to this, the bracket 160 may include at least one sidewall groove 165. The sidewall groove 165, as shown in the drawing, may have a groove form contacting the main body 200 and the eleventh extension part 211 of the first elastic part 210. According to various embodiments of the present disclosure, a projection 301 projecting at a position facing the inner surface of the second elastic part 220 may be disposed at the upper part of the sidewall groove 165 and a peripheral part of the projection 301 may include a seating area (for example, an engraved form (for example, a valley form) where the first wing part 230 and the second wing part 240 are disposed. The lower end side parts of the first wing part 230 and the second wing part 240 are disposed at the engraved part in order to serve to support the second elastic part 220 when a pressure is applied from the direction of the second elastic part 220 to the direction of the first elastic part 210. According to various embodiments of the present disclosure, an edge projecting at the center part may be formed at the upper surface of the projection 301 in order for stable support while contacting the inner side of the second elastic part 220. The sidewall groove 165 may additionally include sidewall projections 302 and 303 for preventing the first wing part 230 and the second wing part 240 from being separated in a horizontal direction of the bracket 160.

Figure 7:
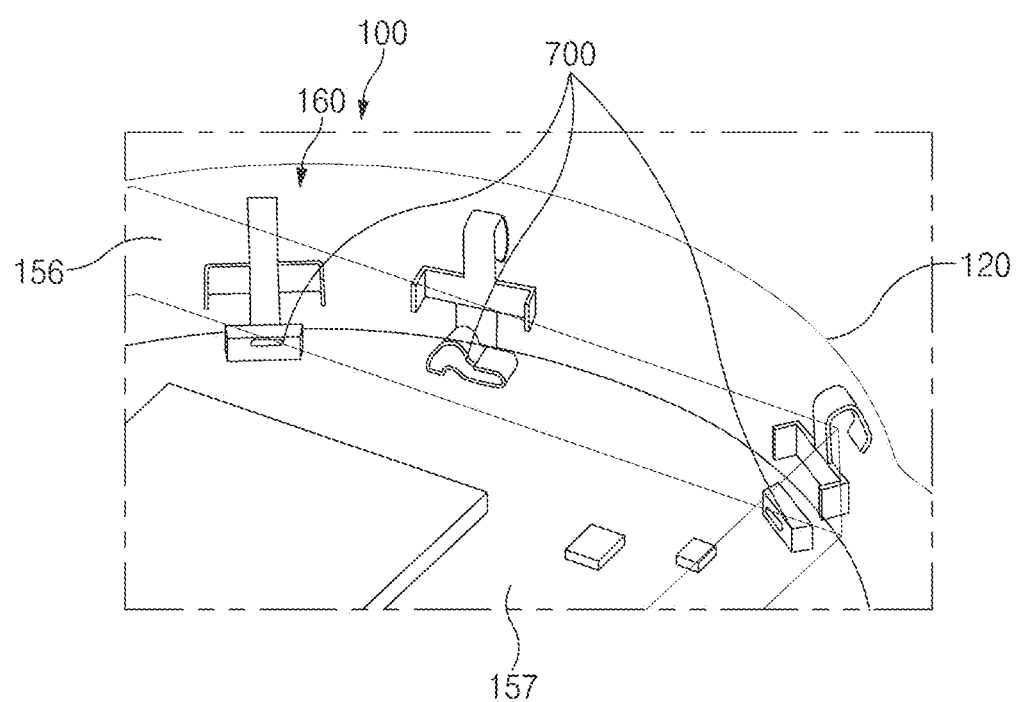
FIG. 7 is a view illustrating a bracket where a main printed circuit board (PCB) and a body case are coupled according to an embodiment of the present disclosure.

FIG. 7 is a view illustrating a bracket where a main PCB and a body case are coupled according to an embodiment of the present disclosure.

Referring to FIG. 7, at least a portion of a wearable electronic device 100, as shown in the drawing, may include a bracket 160, a main PCB 157, and a body case 120. Additionally, a battery 156 may be disposed at one side of the bracket 160. In relation to the wearable electronic device 100 in such a structure, sidewalls of the body case 120 may be disposed from a side direction of the bracket 160 to a direction for surrounding the bracket. On the other hand, one surface of the bracket 160 may be disposed to face the main PCB 157. During this process, specific points of the main circuit substrate 157 may be electrically connected to the connectable modules 160 disposed at the bracket 160 in a direction that the main PCB 157 is stacked. The specific points of the main circuit substrate 157, for example, may be electrically connected to the connectable modules 166 by contact or touch.

According to various embodiments of the present disclosure, first to third contact parts 700 may be disposed at one side of the main circuit substrate 157. The first to third contact parts 700 may be electrically connected to the second elastic part 220 of the connectable module 166 by contact or touch. Additionally, according to various embodiments of the present disclosure, through holes penetrating the side part may be disposed at the contact parts 700. The through holes at the contact parts 700 may be disposed at one side of the connectable module 166 to touch and contact the connectable module 166. For example, the end of the twenty second extension part 222 of the second elastic part 220 of the connectable module 166 may be disposed in the through hole of the contact parts 700 to be electrically connected.

In relation to the above-mentioned structure, as the connectable module 166 is inserted into the sidewall groves of the bracket 160 when the main PCB 157 is disposed at the bracket 160, the wearable electronic device 100 may have a state that the end of the twenty second extension part 222 electrically contacts (or touches) the contact parts 700 of the main circuit substrate 157. Additionally, in relation to the wearable electronic device 100, the body case 120 may be disposed surrounding the side part of the bracket 160 and the sidewall of the body case 120 may electrically contact one side of the first elastic part 210 of the connectable module 166.

Figure 8:
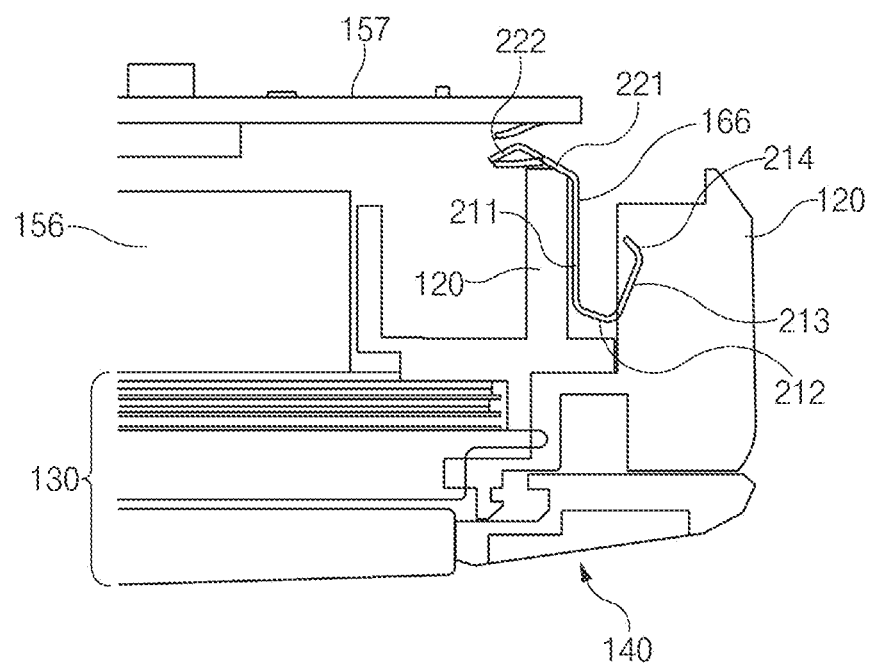
FIG. 8 is an arrangement state section of a connectable module according to an embodiment of the present disclosure.

FIG. 8 is an arrangement state section of a connectable module according to an embodiment of the present disclosure.

Referring to FIG. 8, at least a portion of the wearable electronic device 100, as shown in the drawing, may include the main PCB 157, the battery 156, the bracket 160, the display 130, the bezel wheel 140, the body case 120, and the connectable module 166.

The battery 156 may be disposed inside the bracket 160 and one surface of the battery 156 may be disposed to face the main PCB 157. The display 130 may be disposed at the other side of the bracket 160 and may be disposed to be exposed to the outside through the opening part of the body case 120 or the bezel wheel 140. The body case 120 may be prepared with a metallic material.

According to various embodiments of the present disclosure, in relation to the connectable module 166, a portion (for example, the eleventh extension part 211) of the first elastic part 210 may contact a side surface of the bracket 160 and another portion (for example, at least a portion of the thirteenth extension part 213 and the fourteenth extension part 214) of the first elastic part 210 may contact the body case 120. At this point, the thirteenth extension part 213 and the fourteenth extension part 214 may maintain a firm contact state with the inner sidewall of the body case 120 by exerting elastic force as bending toward a direction closer to the side surface of the bracket 160.

In relation to the connectable module 166, a portion (for example, a connection part of the twenty first extension part 221 and the twenty second extension part 222) of the second elastic part 220 may contact an edge point of the main PCB 157. As described above, contact parts may be disposed in the area of the main PCB 157 adjacent to a position where the second elastic part 220 is disposed. Alternatively, connection points may be disposed in the area of the main PCB 157 and electrical contact may occur while vertically facing a portion of the second elastic part 220.

Figure 9A:
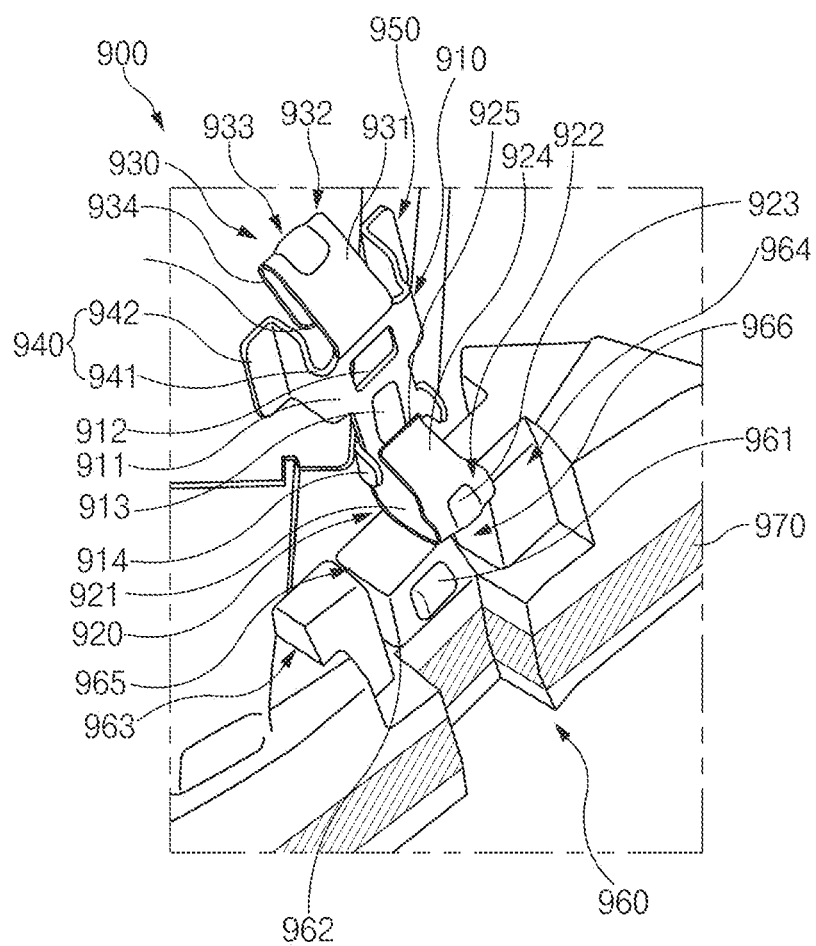
FIG. 9A is a view illustrating another form of a connectable module and a bracket according to an embodiment of the present disclosure.

FIG. 9A is a view illustrating another form of a connectable module and a bracket according to an embodiment of the present disclosure.

Referring to FIG. 9A, a connectable module 900, as shown in the drawing, may include a central part 910, a first elastic part 920, a second elastic part 930, a first wing part 940, and a second wing part 950. The connectable module 900 may be prepared with an electrically conductive material having a specific elasticity. For example, the connectable module 900 may be prepared with one of various metallic materials such as iron, aluminum, copper, nickel, and stainless steel (SUS) or an alloy thereof.

The central part 910 may have a specific thickness and width and may have a length similar to a sidewall height of the bracket 160 or a longer length than a sidewall height. The central part 910, for example, may include a main body 911, a hook coupling hole 912, an elastic protruding part 913 (or a pattern contact part contacting the antenna pattern 970), and auxiliary wings 914. The main body 911 may have a width similar to a width of the sidewall groove 960 formed at the bracket 160, and for example, may have a length similar to a sidewall height of the bracket 160. A specified size (for example, a size corresponding to the hook 961 formed at the sidewall groove 960) of the hook coupling hole 912 may be disposed on a specific portion of the upper end of the main body 911. The hook coupling hole 912 may serve to fix the connectable module 900 as coupled to the hook 961 while the connectable module 900 is seated on the sidewall groove 960. The elastic protruding part 913 may protrude by a specific height from one surface of the main body 911 to a specific direction (for example, a direction vertical to the surface of the main body 911).

As the elastic protruding part 913 protrudes from one surface of the main body 911, the other surface in the opposite direction may have an engraved form. The elastic protruding part 913 may contact the inner wall of the sidewall groove 960. According to an embodiment of the present disclosure, the elastic protruding part 913 may be disposed in an area adjacent to the hook coupling hole 912 and may more firmly contact the inner wall of the sidewall groove 960 by a force that the hook coupling hole 912 is coupled with the hook 961. As mentioned above, the antenna pattern 970 may be additionally disposed at the side surface of the bracket 160. The elastic protruding part 913 may electrically contact the antenna pattern 970. The auxiliary wings 914, for example, may be disposed at the side surface of the main body 911 where the elastic protruding part 913 is disposed. According to an embodiment of the present disclosure, the auxiliary wings 914 may be disposed in a form (for example, a vertical form) of being bent at a specific angle with respect to the surface of the main body 911 at a side surface edge of the main body 911. The auxiliary wings 914 may serve to maintain the rigidity of the main body 911 (for example, prevent the bending of the main body 911).

The first elastic part 920, for example, may include a bottom part 921 extending from the one side end of the central part 910, a first bending part 922 bent from the end of the bottom part 921 with a specific curvature rate in the direction of the central part 910, and an eleventh extension part 924 extending from the end of the first bending part 922 with a specific slope in the direction of the central part 910. Additionally, the first elastic part 920 may further include a twelfth extension part 925 disposed with a specific height at the end of the eleventh extension part 924. The bottom part 921 may extent gently bending from the one side end of the central part 910 and exert elastic force with respect to a pressure applied from the side surface outer direction of the bracket 160 toward the side direction of the bracket 160. For example, when an external pressure is applied, the first bending part 922 connected to the bottom part 921 and the eleventh extension part 924 may be bent in the direction of the main body 911 or in a direction tiled at a specified angle toward the main body 911. The first bending part 922 may be formed by extending from the end of the bottom part 921 and bending in the direction of the main body 911.

A first protruding part 923 protruding by a specific height in the outer direction of the main body 911 may be prepared at a specific position of the first bending part 922. The first protruding part 923, for example, may be disposed in a dome form at the center of the first bending part 922. The first protruding part 923 may be prepared in a round form. As protruding by a specific height toward the surface of the first bending part 922, the first protruding part 923 may firmly maintain at least a point of contact with the coupled body case 120. As the first protruding part 923 protrudes from one surface of the first bending part 922, the other surface (for example, the rear of the surface where the first protruding part 923 protrudes) of the first bending part 922 may be prepared in an engraved (or sunk) form. The eleventh extension part 924 may be prepared in a form of gradually reducing a width in the direction of the main body 911 at a point connected to the first bending part 922. Even when the first bending part 922 is bent by a pressure applied, such a form may limit a moving range of the eleventh extension part 924 in order to prevent the damage of a surrounding structure (for example, the bracket 160). The twelfth extension part 925, as an area for finishing the end of the eleventh extension part 924, may be a rounding area of the eleventh extension part 924.

The first wing part 940 may include a fifteenth extension part 941 extending from one edge (for example, the right edge of the main body 911 at a position where the hook coupling hole 912 is disposed) of the main body 911 toward a direction tilted at a specific angle (for example, a vertical angle) with respect to the main body 911 and a sixteenth extension part 942 extending from the end of the fifteenth extension part 941 toward a direction tilted at a specific angle (for example, a vertical angle) with respect to the fifteenth extension part 941. In relation to the fifteenth extension part 941, for example, a partial area connected to the main body 911 may have a first width and an area connected to the sixteenth extension part 942 may have a second width. Accordingly, the fifteenth extension part 941 may be prepared in a step form. Alternatively, the fifteenth extension part 941 may be prepared in a form of gradually widening a width from a point connected to the main body 911. In relation to a structure of the fifteenth extension part 941, a connection width with the main body 911 may be maintained and a surface contacting the bracket 160 may be obtained sufficiently, thereby supporting the connectable module 900 to be fixedly inserted into the bracket 160 more firmly. The first wing part 940 may be prepared with a right angle-shaped section.

The second wing part 950 may have the same form and size as the first wing part 940. The second wing part 950 may be disposed at the other edge (for example, the right edge of the main body 911 at a position where the hook coupling hole 912 is disposed) of the main body 911. The second wing part 950 may be disposed to be symmetric to the first wing part 940 based on the vertical center line of the main body 911.

The second elastic part 930 may include a twenty first extension part 931 extending from the upper side of the main body 911 at a specific slope, a second bending part 932 disposed at the end of the twenty first extension part 931, a twenty second extension part 934 extending from the end of the second bending part 932, and a twenty third extension part 935 formed at the twenty second extension part 934. The twenty first extension part 931 may be formed with a width similar to the width of the main body 911. The twenty first extension part 931 may be disposed tilted at a specific angle (for example, a bending angle from the upper direction toward the center direction of the bracket 160) with respect to the surface of the main body 911. The twenty first extension part 931 tilted at the specific angle may provide elastic force with respect to an external pressures (for example, a pressure by contact with the main PCB 157) by using the main body 911 as an axis. The second bending part 932 may be prepared bending from the end of the twenty first extension part 931 toward a lower direction where the first elastic part 920 is disposed or the surface direction of the main body 911. A second protruding part 933 may be disposed at a specific point of the second bending part 932. The second protruding part 933 may be prepared in a form similar to that of the first protruding part 923. The second protruding part 933 may form a point of contact for a connection point of the main PCB 157 facing the second elastic part 930 and support the contact to be maintained firmly by an elastic force of the twenty first extension part 931 connected to the second bending part 932. The twenty third extension part 935 may be an area finishing the end of the twenty second extension part 934. The twenty third extension part 935 may be disposed bending from the end of the twenty second extension part 934 toward a direction looking at the inner side surface of the twenty first extension part 931.

The bracket 160 may include a sidewall groove 960 where the connectable module 900 is seated. The sidewall groove 960, as shown in the drawing, may include a groove body 967 where the main body 911 of the connectable module 900 is disposed, a hook protruding from the surface of the groove body 967, and a seating area where the first wing part 940 or the second wing part 950 is fixed (for example, pillar parts 963 and 964 for forming gaps 965 and 966 where the wing parts 940 and 950 are inserted). In relation to the groove body 967, sidewalls may be disposed in parallel with a specific interval in order to form a groove where the main body 911 of the connectable module 900 is disposed. Additionally, the groove body 967 may include a main pillar part 962 facing the second elastic part 930. The hook 961 may be disposed at one surface of the main pillar part 962. The gaps 965 and 966 may be respectively disposed between the main pillar part 962, and the left pillar part 963 and the right pillar part 964. At least two surfaces of the left pillar part 963 and the right pillar part 964 may serve to support the first wing part 940 and the second wing part 950 as facing or contacting the first wing part 940 and the second wing part 950.

Figure 9B:
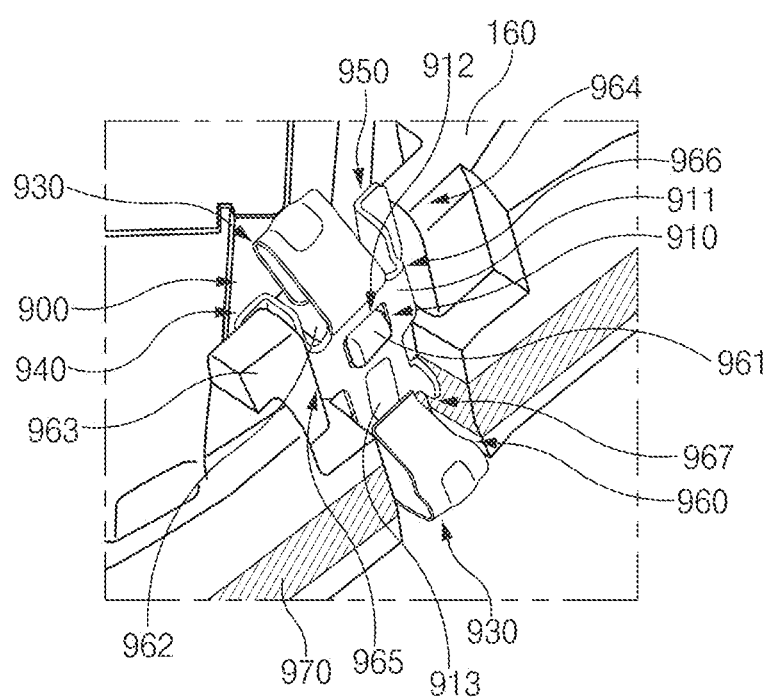
FIG. 9B is a view illustrating a bracket mounted with a connectable module according to an embodiment of the present disclosure.

FIG. 9B is a view illustrating a bracket mounted with a connectable module according to an embodiment of the present disclosure.

Referring to FIG. 9B, the connectable module 900 may be fixedly inserted into the sidewall groove 960 formed at the bracket 160. During this process, the first wing part 940 of the connectable module 900 may be fixedly inserted into the gap 965 formed between the main pillar part 962 and the left pillar part 963 and the second wing part 950 may be fixedly inserted into the gap 966 formed between the main pillar part 962 and the right pillar part 964. Additionally, the hook coupling hole 912 formed at the main body 911 may be coupled with the hook 961 disposed at the groove body 967. The elastic protruding part 913 may point-contact or surface-contact the surface of the groove body 967. The elastic protruding part 913 may maintain an electrical contact with the antenna pattern 970 disposed at the surface of the groove body 967. The first elastic part 920 may be disposed in a form protruding by a specific length from the side surface of the bracket 160 toward the outer direction. While the body case 120 is coupled, the first elastic part 920 may maintain a firm coupling with the body case 120 as restoration force (or elastic force) is applied in the direction of the body case 120 by the elastic force of the bottom part 921 as bending in the direction of the main body 911.

As mentioned above, a connectable module used in an electronic device (for example, a wearable electronic device) according to an embodiment of the present disclosure may include a first elastic part disposed to exert a specific elastic force against a pressures applied in a side direction, a second elastic part disposed to exert a specific elastic force against a pressure applied in a vertical direction, and a main body connected to the first elastic part and the second elastic part.

According to various embodiments of the present disclosure, the first elastic part and the second elastic part may be disposed to be symmetric vertically, horizontally, or back and forth, based on the main body.

According to various embodiments of the present disclosure, the first elastic part may include a first extension part extending from one side edge of the main body at a specific slope in the side direction, a bending part bending from the end of the first extension part at a specific curvature rate in the main body direction, and a second extension part extending from the end of the bending part at a specific slope in the main body direction.

According to various embodiments of the present disclosure, the first elastic part may further include a protruding part protruding from one surface of the bending part.

According to various embodiments of the present disclosure, the first elastic part may include a first extension part extending from one side edge of the main body at a specific slope in the side direction, a second extension part extending from the end of the first extension part at a specific slope in a direction away from the main body direction, and a third extension part extending from the end of the second extension part at a specific slope in the main body direction.

According to various embodiments of the present disclosure, the second elastic part may include a first extension part extending from the main body edge with a specific length and slope and exerting elastic force in correspondence to the vertically applied pressure and a second extension part extending from the end of the first extension part in a slope direction opposite to the slope of the first extension part.

According to various embodiments of the present disclosure, the second elastic part may include a first extension part extending from the main body edge with a specific length and slope and exerting elastic force in correspondence to the vertically applied pressure, a bending part bending from the end of the first extension part toward the main body direction, and a second extension part extending from the end of the bending part toward the main body direction at a specific slope.

According to various embodiments of the present disclosure, the second elastic part may further include a protruding part protruding from one surface of the bending part.

According to various embodiments of the present disclosure, the connectable module may further include at least one of a hole penetrating the front and rear surface at the main body one side, at least one auxiliary wing extending from the main body at a specific slope, and a protruding part protruding from the main body one surface.

According to various embodiments of the present disclosure, the connectable module may further include at least one wing part extending in a direction different from the first elastic part or the second elastic part at the edge of the main body.

According to various embodiments of the present disclosure, the wing part may include a first extension part extending from the edge of the main body to be vertical to the main body and a second extension part extending from the end of the first extension part to be vertical to the direction that the first extension part extends.

Figure 10:
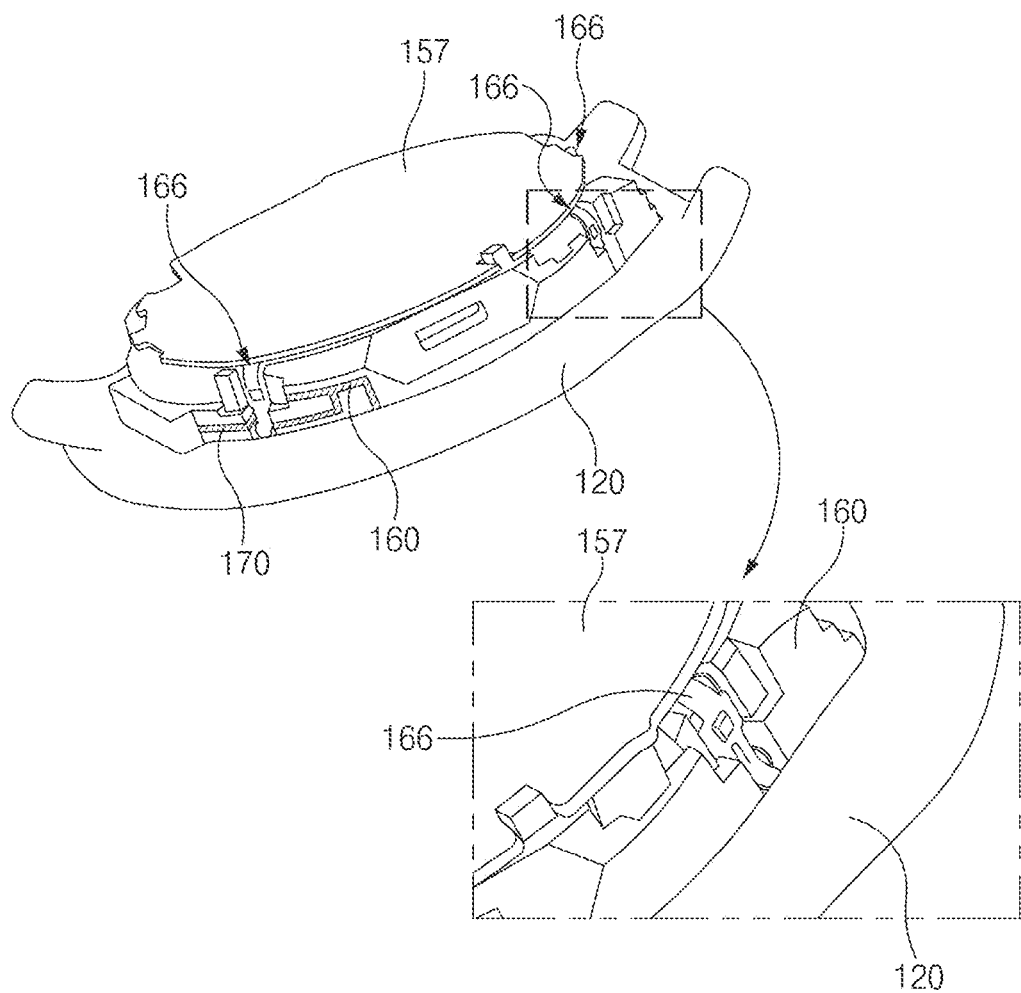
FIG. 10 is a view illustrating a portion of a wearable device mounted with a connectable module according to an embodiment of the present disclosure.

FIG. 10 is a view illustrating a portion of a wearable device mounted with a connectable module according to an embodiment of the present disclosure.

Referring to FIG. 10, at least a portion of the wearable electronic device 100 discloses its contact structure configured with a metal housing (for example, the body case 120) including a communication available antenna. The antenna structure may be configured with a body case 120 formed of metal generally, a bracket 160 equipped with an antenna pattern 170, a main PCB 157, and a connectable module 166 connecting the body case 120, the bracket 160, and the main PCB 157.

The body case 120 may be formed of metal generally. The body case 120 may include a hole equipped with the display 130 at the inner center and form a cavity including electronic components. The inner wall of the body case 120 is grounded with the connectable module 166 and is connected to the antenna pattern 170 on the main PCB 157 or the bracket 160 to be used as a portion of the antenna.

The bracket 160 may mount hardware (HW) components such as the main PCB 157 and the battery 156 therein. The bracket 160 may be formed of a non-conductive material such as plastic generally and the antenna pattern 170 is formed in at least some areas. The antenna pattern 170 formed at the bracket 160 is grounded with the connectable module 166 and is connected to the main PCB 157 or a metal housing (for example, the body case 120) to be configured as part of the antenna.

The main PCB 157 provides a mounting space of electronic components. The main PCB 157 is grounded with the connectable module 166 and is connected to the antenna pattern 170 on the metal housing or the bracket 160 to be configured as part of the antenna.

The connectable module 166 may be formed of metal generally. The connectable module 166 may be formed of a plate generally to include an elastic structure in some sections. The connectable module 166 may have elastic force in at least two directions. The connectable module 166 may be assembled to the bracket 160 generally and an assembly part for fixture may be further provided. The connectable module 166 may be grounded with the main PCB 157, the antenna pattern 170 on the bracket 160, and a metal housing (for example, the body case 120). The connectable module 166 may be grounded with a conductive pattern in some areas to serve as part of the antennal. The connectable module 166 bending in a form having elastic force may prevent performance degradation for modification due to tolerance or external shock. According to an embodiment of the present disclosure, a connectable module grounded to the side of the main PCB 157 has elasticity in a vertical direction in order to correspond to the assembly tolerance and shock in a stacking direction. Similarly, a connectable module grounded to the inner sidewall of a metal housing (for example, the body case 120) has elasticity in a horizontal direction to facilitate assembly and provides continuous elasticity in the inner sidewall direction to obtain stable contact continuously after the assembly.

In relation to the wearable electronic device 100, a flange assembly part (for example, a wing part) formed in a direction vertical to both contact parts (for example, the first elastic part and the second elastic part) is assembled between the sidewall structures at both sides of the bracket 160 that is the internal housing. The flange assembly part may further include a bending part in a wing-like form to save a mounting space and further provide a horizontal assembly guide. In order to prevent a movement after the assembly, a groove (for example, a hook coupling hole) may be formed at the center part instead of a clip (for example, the connectable module) and an assembly projection (for example, a hook) corresponding to the assembly groove may be formed at the bracket surface that is the counterpart. Additionally, as a method for preventing an additional movement, a protruding part (for example, an elastic protruding part) is formed in a partial area of a clip to overlap the bracket inner side surface to provide a press. The assembly components may be formed opposite to each other.

According to various embodiments of the present disclosure, as shown in the drawing, a plurality of connectable modules 166 may be disposed in the wearable electronic device 100. Each of the plurality of connectable modules 166 may be electrically connected to a specific point of the body case 120. Accordingly, the antenna radiation performance of the body case 120 may vary according to characteristics that the connectable modules 166 operate. For example, at least one of the plurality of connectable modules 166 may serve as a feeding part of an antenna and at least one of the remaining may serve as a ground part.

Figure 11:
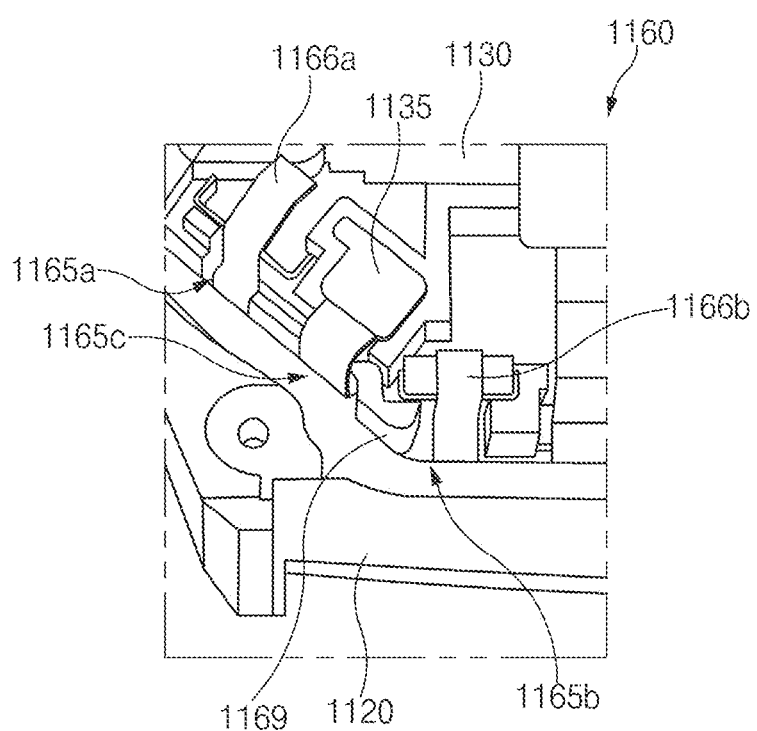
FIG. 11 is a detailed view illustrating a portion of a wearable electronic device according to an embodiment of the present disclosure.

FIG. 11 is a detailed view illustrating a portion of a wearable electronic device according to an embodiment of the present disclosure.

Referring to FIG. 11, as mentioned above, sidewall grooves may be disposed at one side of the bracket 1160. For example, the bracket 1160 may include a first sidewall groove 1165a electrically connected to the body case 1120 and seating a first connectable module 1166a serving as a feeding part of a communication module, a second sidewall groove 1165b electrically connected to a body case 1120 and seating a second connectable module 1166b serving as a ground part of a communication module, and a third sidewall groove 1165c where a ground signal line 1135 is disposed. The first connectable module 1166a and the second connectable module 1166b, for example, may be prepared with the same form and material substantially. According to various embodiments of the present disclosure, the first connectable module 1166a and the second connectable module 1166b may be formed with different sizes. Correspondingly, the first sidewall groove 1165a and the second sidewall groove 1165b may be prepared with the same form substantially. When the second connectable module 1166b is prepared smaller than the first connectable module 1166a, the second sidewall groove 1165b may be prepared relatively smaller than the first sidewall groove 1165a. According to an embodiment of the present disclosure, an antenna pattern may be disposed at the first sidewall groove 1165a. Accordingly, the antenna pattern may electrically contact the seated first connectable module 1166a. According to an embodiment of the present disclosure, an additional antenna pattern may not be formed at the second sidewall groove 1165b where the second connectable module 1166b serving as a path of a ground part is seated.

The ground signal line 1135, for example, may be connected to a metallic portion (for example, a driver IC or low-voltage differential signaling (LVDS) display interface (LDI) of a display) of the display 1130. At least a portion of the ground signal line 1135 may be disposed at the third sidewall groove 1165c and at least a portion of the remaining may be disposed at a seating part formed at the upper end of the bracket 1160. In relation to this, a seating groove where a pad part of the ground signal line 1135 is seated may be provided at the upper end of the bracket 1160.

According to various embodiments of the present disclosure, a connection pattern 1169 electrically connected to the third sidewall groove 1165c or the seating groove where the pad part of the ground signal line 1135 is seated may be disposed at the inner wall of the second sidewall groove 1165b. Accordingly, the ground signal line 1135 may be electrically connected to the second connectable module 1166b. The ground area of the display 1130 may serve as the ground of a device component (for example, a communication module and so on) disposed at a main PCB as being connected to the ground signal line 1135, the connection pattern 1169, the second connectable module 1166b, the body case 1120, and the main PCB.

Figure 12:
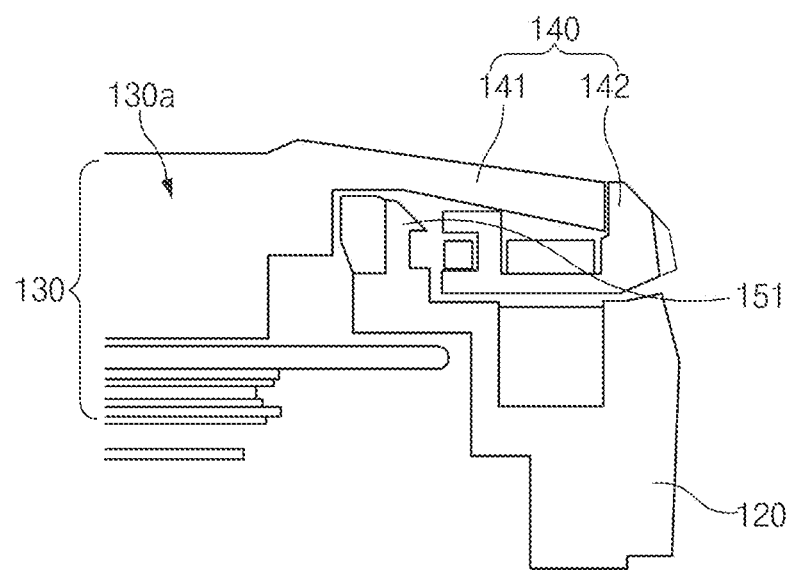
FIG. 12 is a sectional view of a wearable electronic device including a bezel wheel according to an embodiment of the present disclosure.

FIG. 12 is a sectional view of a wearable electronic device including a bezel wheel according to an embodiment of the present disclosure.

Referring to FIG. 12, at least part of the wearable electronic device may include a body case 120, a bezel wheel 140, a friction adjustment ring 151, and a display 130. The body case 120, as shown in the drawing, may be provided to support the display 130 and the bezel wheel 140 through the friction adjustment ring 151. The bezel wheel 140, for example, may include a first area 141 (for example, the inner part of the bezel wheel) formed of a non-conductive material and a second area 142 (for example, the outer part of the bezel wheel) formed of a conductive material.

The wearable electronic device 100, as a structure for obtaining antenna performance, may include an arrangement for separating a metallic component (for example, the outer part of the bezel wheel) from the peripheral area of the display 130. For example, in relation to the wearable electronic device 100, a partial area of the bezel wheel 140 adjacent to the display 130 is formed of ceramic and provided is an arrangement in which a metallic component is separated toward the outside of the bezel wheel 140. In order to prevent the collision between the ceramic portion of the bezel wheel 140 and the window 130a of the display 130, the wearable electronic device 100 may have a state in which one surface of the friction adjustment ring (or a friction ring) fixed at the assembly part faces the periphery of the ceramic (for example, the inside surface of the inner part of the bezel wheel 140). Accordingly, as an area having no metal between the one surface of the body case 120 and the display 130 (for example, an area having a ceramic therebetween) is formed, it is possible to improve a radio radiation function.

As mentioned above, the wearable electronic device 100 may have a good signal radiation performance as a signal radiation through the body case 120 and the antenna pattern is accomplished through a separated path between the display 130 and the bezel wheel 140.

Figure 13A:
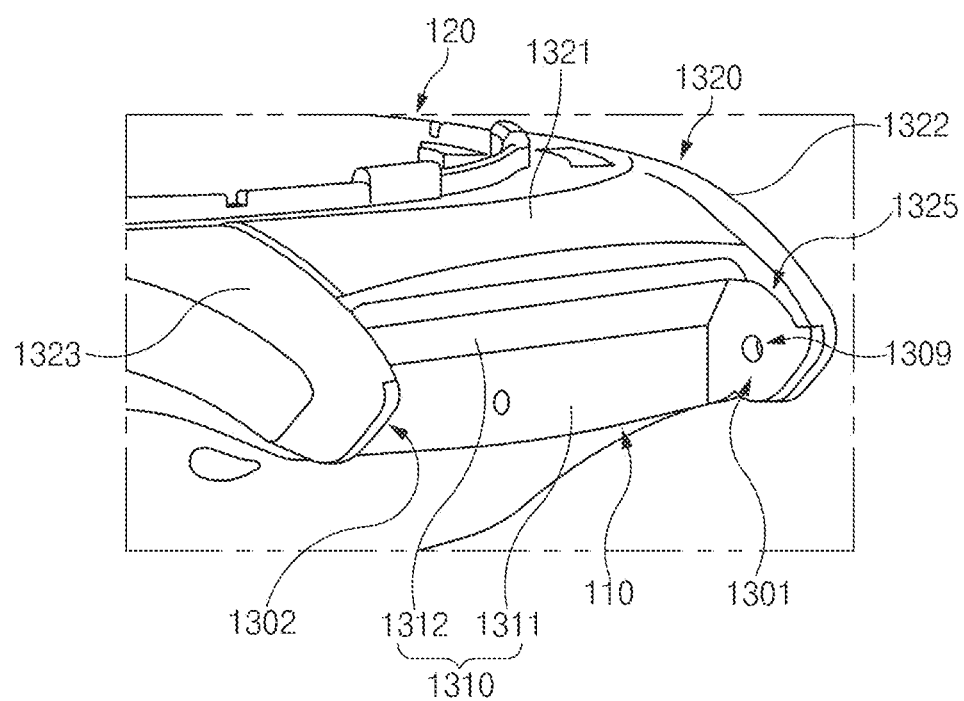
FIG. 13A is a view illustrating a coupled body case and cover housing according to an embodiment of the present disclosure.

FIG. 13A is a view illustrating a coupled body case and cover housing according to an embodiment of the present disclosure.

Referring to FIG. 13A, the body case 120 may be largely or entirely prepared with a metallic material. The body case 120 may include a coupling support part 1320 for supporting the coupling of the circular center part and a wearing part. The coupling support part 1320, for example, may include an extension part 1321 having a specific thickness and width and disposed parallel to the tangential direction of the circular center part, and a first housing cover part 1322 and a second housing cover part 1323 disposed parallel to the side surface of the extension part 1321 at both sides of the extension part 1321 and extending longer than the end of the extension part 1321. The surface of the extension part 1321 may be prepared in a round form. The surface of the extension part 1321 may be processed through polishing. The first housing cover part 1322 and the second housing cover part 1323 may be disposed to cover the coupling part of the cover housing 110. The first housing cover part 1322 and the second housing cover part 1323 may be spaced from each other by the horizontal side length of the extension part 1321 to be disposed in a form facing each other. The first housing cover part 1322 and the second housing cover part 1323 may include single layer parts formed thicker than the bottom around the edge. The single layer parts 1325 may be disposed to face one surface of the first coupling part 1301 and the second coupling part 1302 of the cover housing 110.

The cover housing 110 may be disposed at the lower part of the body case 120 and is coupled with the body case 120 to serve to support the body case 120. As mentioned above, the inner side of the cover housing 110 may include a seating part for seating various hardware components of the wearable electronic device 100. The cover housing 110, as shown in the drawing, may include a first coupling part 1301 and a second coupling part 1032 extending from the center toward the outer direction and a cover part 1310 connecting the first coupling part 1301 and the second coupling part 1032. The first coupling part 1301 may be coupled with the first housing cover part 1322. The second coupling part 1302 may be coupled with the second housing cover part 1323.

The first coupling part 1301 and the second coupling part 1302 may be spaced from each other by the horizontal length of the cover part 1310 to be disposed to face each other. Coupling holes 1309 to be coupled with a wearing part may be respectively formed at the first coupling part 1301 and the second coupling part.

The cover part 1310 may include a first joint part 1311 for jointing the bottom of the first coupling part 1301 and the bottom of the second coupling part 1302 and a second joint part 1312 for jointing the side part of the first coupling part 1301 and the side part of the second coupling part 1302. The first joint part 1311 and the second joint part 1312 may be disposed to be connected in parallel with a specific angle (for example, an obtuse angle). The second joint part 1312, for example, may be disposed to cover more than a specific bottom area of the extension part 1321 of the body case 120. For example, the second joint part 1312 may be disposed to cover the entire inside (or substantially the entire) of the extension part 1321. Accordingly, even when the metallic wearing part is coupled to the coupling parts 1301 and 1302, the cover housing 110 may suppress the electrical contact between the body case 120 and the wearing part. As shown in the drawing, even when the wearing part is worn on a user's wrist or a specific position (for example, a desk and so on) after mounted on the cover housing 110, the second joint part 1312 is formed at a position where the wearing part does not directly contact the body case 120.

Figure 13B:
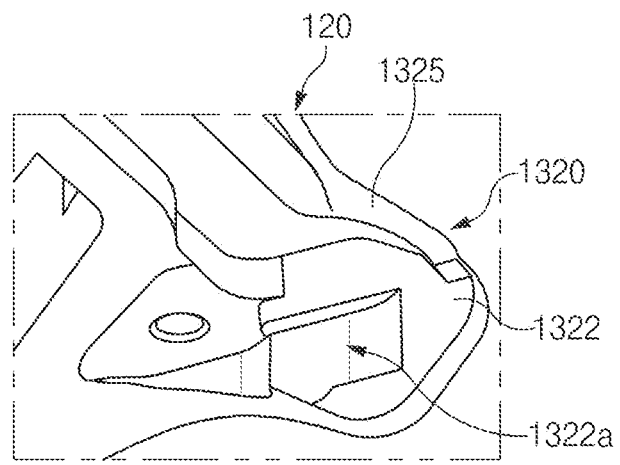
FIG. 13B is an exploded perspective view illustrating a coupling area of a body case and a cover housing according to an embodiment of the present disclosure.
Figure 13B:
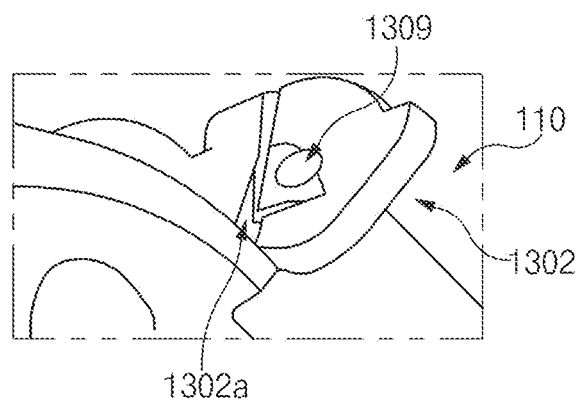

FIG. 13B is an exploded perspective view illustrating a coupling area of a body case and a cover housing according to an embodiment of the present disclosure.

Referring to FIG. 13B, one side of the shown body case 120, for example, illustrates the inside surface of the first housing cover part 1322. The body case 120 is formed of a metallic material and in order to enhance the coupling force, in a mutually coupling structure after the cover housing 110 is formed of a non-conductive material, the inside of the first housing cover part 1322 may include a groove 1322a deepening from the edge toward the center direction gradually. A projection 1302a prepared at the cover housing 110 may be fixedly inserted into the groove 1322a.

The cover housing 110, for example, illustrates the outer surface of the second coupling part 1302. The second coupling part 1302 may include a coupling hole 1309 for coupling with the wearing part and a projection 1302a may be disposed at the surface coupled with the body case 120. The projection 1302a may be disposed in an area adjacent to the coupling hole 1309. According to an embodiment of the present disclosure, the projection 1302a may be prepared in a form that a thickness becomes thicker from the outer peripheral surface of the coupling hole 1309 toward a direction away from the coupling hole 1309. At least a portion of the projection 1302a may be prepared in a form coupled with the form of the groove 1322a. As mentioned above, the projection 1302a having a gradually changing thickness supports a smooth insertion during the coupling of the cover housing 110 and the body case 120 and a severed edge suppresses the release of the cover housing 110.

In relation to obtaining the antenna performance, the wearable electronic device 100 may include strap connection part (for example, a coupling part of the cover housing 110) in an injection form. When a metal strap (for example, a wearing part) is mounted, as contacting a metal housing (for example, the body case 120), the performance of a preset antenna may not be obtained. In order to prevent this phenomenon, when a metal strap is mounted, the wearable electronic device 100 may include the inside surface of a strap connection part where contact occurs, through injection. Like this embodiment, a partial area of the injection piece housing (for example, the cover housing 110) is extended and provided and although not shown in the drawing, a method of adding an additional structure and obtaining insulation may be also possible. For example, the additional structure may include an insulator for surrounding a connection part of a metal strap. Alternatively, only a portion connected to the metal strap and the body case 120 may be prepared with a non-conductive material. In order to prevent the injection part (for example, a coupling part of the cover housing 110) from widening by the strap wearing, the wearable electronic device 100 may further include a hook structure (for example, the groove 1322a and the projection 1302a) coupling the injection housing and the metallic housing around the strap connection part.

As mentioned above, according to various embodiments of the present disclosure, an electronic device (for example, a wearable electronic device) may include a main PCB, a non-conductive bracket where the main PCB is stacked, a metal body case of which at least a portion is disposed at a side part of the bracket, and at least one connectable module disposed at one side of the bracket to electrically connect a specific point of the main PCB with the body case. The connectable module may include a first elastic part electrically connected to the body case coupled in a side direction and disposed to exert a specific elastic force against a pressure applied from the body case, a second elastic part electrically connected to a predetermined point of the main PCB stacked in a vertical direction and disposed to exert a specific elastic force against a vertical pressures by the main PCB, and a main body connected to the first elastic part and the second elastic part.

According to various embodiments of the present disclosure, the electronic device may further include a display electrically connected to the main PCB and the connectable module may be electrically connected to a ground area of the display. A ground signal line connected to a ground area of the display and disposed at a side surface of the bracket and a connection pattern disposed at one side of the bracket to be electrically connected to the ground signal line and electrically connected to the connectable module may be further included.

According to various embodiments of the present disclosure, the bracket may include at least one sidewall groove where at least one connectable module is seated and an antenna pattern disposed on at least a portion of the surface of the sidewall groove and the side surface of the bracket to be electrically connected to the connectable module.

According to various embodiments of the present disclosure, the electronic device may further include a bezel wheel disposed around an opening part formed at the center of the body case and coupled to be rotatable and the bezel wheel may include a first non-conductive area (for example, a ceramic area) disposed around an opening part of the body case and a second area (for example, a metallic wheel area) coupled with first area and disposed spaced a specific interval from the body case surface in an edge area of the first area.

According to various embodiments of the present disclosure, the electronic device may further include a non-conductive cover housing where at least a portion of the main PCB and the bracket is seated and which includes a non-conductive cover housing coupled with the body case, and the cover housing may include coupling parts coupled with one side of a wearing part for supporting the wearing of the wearable electronic device and a cover part disposed between one side of the wearing part and the body case to suppress an electrical contact between the wearing part and the body case and for jointing the coupling parts.

According to various embodiments of the present disclosure, in relation to the electronic device, a plurality of connectable modules may be electrically connected to the body case and at least one connectable module electrically connected to the body case may be electrically connected to a ground area of a display.

According to various embodiments of the present disclosure, the connectable module may further include at least one of a first protruding part protruding from the surface of the first elastic part to form a point of contact with the body case and a second protruding part protruding from the surface of the second elastic part to form a point of contact with the main PCB.

According to various embodiments of the present disclosure, the main PCB may include at least one contact part into which one side of the second elastic part is inserted.

According to various embodiments of the present disclosure, the second elastic part may electrically contact a communication module of the main PCB.

According to various embodiments of the present disclosure, the connectable module may further include wing parts extending from an edge of the main body and the bracket may include a sidewall groove (for example, a home body) where the connectable module is seated and a seating area where the wing parts are fixedly seated.

According to various embodiments of the present disclosure, at least one of the main PCB, the bracket, the body case, the display, and the cover housing may have a circular form generally or substantially. Alternatively, at least one of the main PCB, the bracket, the body case, and the cover housing may include an additional structure for the wearing part connection based on a circular form.

In relation to a connectable module and an electronic device including the same, various embodiments may support a more stable electrical connection and provide an improved communication function.

Also, preferred embodiments of the present disclosure disclosed in this specification and drawings are provided as specific examples to describe technical content and help understanding and also do not limit the scope of the present disclosure. It is apparent to those skilled in the art that other modifications based the technical ideas of the present disclosure are possible.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
  a main printed circuit board (PCB);
  a bracket where the main PCB is disposed at an upper part or a lower part of the bracket;
  a body case of which at least a portion is disposed at one side of the bracket;
  at least one connectable module disposed at the other side of the bracket to electrically connect a specific point of the main PCB and the body case;
  a display electrically connected to the main PCB,
  a ground signal line connected to a ground of the display and disposed at a side surface of the bracket; and
  a connection pattern disposed at one side of the bracket to be electrically connected to the ground signal line and electrically connected to the at least one connectable module,
  wherein the at least one connectable module is electrically connected to the ground of the display, and
  wherein the at least one connectable module comprises:
    a first elastic part disposed to exert a specific elastic force in a side direction;
    a second elastic part disposed to exert a specific elastic force in a vertical direction; and
    a main body connected to the first elastic part and the second elastic part.

2. The wearable electronic device of claim 1, wherein the bracket comprises:
  at least one sidewall groove where at least one connectible module is seated; and
  an antenna pattern disposed on at least a portion of the surface of the sidewall groove and the side surface of the bracket to be electrically connected to the connectible module.

3. The wearable electronic device of claim 1, further comprising a bezel wheel disposed around an opening part at a center of the body case to be rotatably coupled,
  wherein the bezel wheel comprises:
    a non-conductive first area disposed around the opening part of the body case; and
    a second area coupled with the first area and disposed spaced a specific interval from the surface of the body case in an edge area of the first area.

4. The wearable electronic device of claim 1, further comprising a cover housing where at least a portion of the main PCB and the bracket is seated and which is coupled with the body case,
  wherein the cover housing comprises:
    coupling parts where one side of a wearing part supporting the wearing of the wearable electronic device is coupled; and
    a cover part disposed between one side of the wearing part and the body case to suppress an electrical contact between the wearing part and the body case and configured to join the coupling parts.

5. The wearable electronic device of claim 1, wherein a plurality of connectable modules are electrically connected to the body case and one or more of the plurality of connectable modules electrically connected to the body case is electrically connected to the ground of the display.

6. The wearable electronic device of claim 1, wherein the first elastic part is electrically connected to the body case coupled in a side direction and is disposed to exert a specific elastic force against a pressure applied from the body case, and
  wherein the second elastic part is electrically connected to a specific point of the main circuit substrate stacked in a vertical direction and is disposed to exert a specific elastic force against a vertical direction pressure by the main circuit substrate.

7. The wearable electronic device of claim 1, wherein the at least one connectable module comprises at least one of:
  a first protruding part configured to form a point of contact with the body case by protruding from a surface of the first elastic part; and
  a second protruding part configured to form a point of contact with the main circuit substrate by protruding from a surface of the second elastic part,
  wherein the main PCB comprises at least one contact part contacting one side of the second elastic part.

8. The wearable electronic device of claim 1, wherein the second elastic part electrically contacts a communication module of the main PCB.

9. The wearable electronic device of claim 1, wherein the connectible module further comprises wing parts extending from an edge of the main body, and
wherein the bracket comprises a home body where the main body is seated and a seating area where the wing parts are fixedly seated.

10. A connectable module used in a wearable electronic device, the module comprising:
a first elastic part disposed to exert a specific elastic force against a pressure applied in a side direction;
a second elastic part disposed to exert a specific elastic force against a pressure applied in a vertical direction; and
a main body connected to the first elastic part and the second elastic part,
wherein the first elastic part and the second elastic part are disposed to be symmetric vertically, horizontally, or back and forth based on the main body, and
wherein the first elastic part comprises:
a first extension part configured to extend from one side edge of the main body toward the side direction at a specific slope,
a bending part configured to bend from an end of the first extension part toward the main body direction at a specific curvature rate,
a second extension part configured to extend from an end of the bending part toward the main body direction at a specific slope, and
a protruding part configured to protrude from one surface of the bending part.

11. The module of claim 10, wherein the first elastic part comprises a third extension part configured to extend from an end of the second extension part toward the main body direction at a specific slope.

12. The module of claim 10, wherein the second elastic part comprises:
a first extension part configured to extend with a specific length and slope from an edge of the main body to exert an elastic force in correspondence to a pressure applied in the vertical direction; and
a second extension part configured to extend from an end of the first extension part toward a slope direction opposite to the slope of the first extension part.

13. The module of claim 10, wherein the second elastic part comprises:
a first extension part configured to extend with a specific length and slope from an edge of the main body and exert an elastic force in correspondence to a pressure applied in the vertical direction;
a bending part configured to bend from an end of the first extension part toward the main body direction; and
a second extension part configured to extend from an end of the bending part toward the main body direction at a specific slope.

14. The module of claim 13, wherein the second elastic part further comprises a protruding part configured to protrude from one surface of the bending part.

15. The module of claim 10, further comprising at least one of:
a hole configured to penetrate front and rear surfaces at one side of the main body;
at least one auxiliary wing configured to extend from an edge of the main body at a specific slope with respect to the main body; and
a protruding part configured to protrude from one surface of the main body.

16. The module of claim 10, further comprising at least one wing part configured to extend from an edge of the main body in a direction different from the first elastic part or the second elastic part,
wherein the wing part comprises:
a first extension part configured to extend vertical to the main body from an edge of the main body; and
a second extension part configured to extend vertical to a direction that the first extension part extends from an end of the first extension part.

* * * * *